United States Patent
Lin et al.

(10) Patent No.: US 11,087,327 B2
(45) Date of Patent: Aug. 10, 2021

(54) RESOURCE TRANSFER METHOD, FUND PAYMENT METHOD, AND ELECTRONIC DEVICE

(71) Applicant: Advanced New Technologies Co., Ltd., Grand Cayman (KY)

(72) Inventors: Shumin Lin, Hangzhou (CN); Liyun Dong, Shanghai (CN); Jianlong Huang, Hangzhou (CN); Donglin Jia, Hangzhou (CN); Yuanshen Li, Hangzhou (CN); Liang Zhou, Hangzhou (CN); Hongwei Zhao, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 5 days.

(21) Appl. No.: 16/673,199

(22) Filed: Nov. 4, 2019

(65) Prior Publication Data

US 2020/0065822 A1 Feb. 27, 2020

Related U.S. Application Data

(63) Continuation of application No. PCT/CN2018/103001, filed on Aug. 29, 2018.

(30) Foreign Application Priority Data

Aug. 30, 2017 (CN) .......................... 201710765152.4

(51) Int. Cl.
*G06Q 20/40* (2012.01)
*G06F 21/32* (2013.01)

(52) U.S. Cl.
CPC ....... *G06Q 20/40145* (2013.01); *G06F 21/32* (2013.01)

(58) Field of Classification Search
CPC .......................... G06Q 20/40145; G06F 21/32
(Continued)

(56) References Cited

U.S. PATENT DOCUMENTS 9,147,117 B1 * 9/2015 Madhu ............... G06K 9/00335
9,298,974 B1 * 3/2016 Kuo ..................... H04N 13/271
(Continued)

FOREIGN PATENT DOCUMENTS

CN 102467708 5/2012
CN 102663444 9/2012
(Continued)

OTHER PUBLICATIONS

"Objective 3D face recognition: Evolution, approaches and challenges," by Dirk Smeets, Peter Claes, Dirk Vandermeulen, John Geral Clement. Forensic Science International. vol. 201. Sep. 10, 2010. pp. 125-132. (Year: 2010).*

(Continued)

*Primary Examiner* — Sara C Hamilton
(74) *Attorney, Agent, or Firm* — Fish & Richardson P.C.

(57) ABSTRACT

A face image of a resource transferor is obtained, wherein the face image is used to authenticate an identity of the resource transferor. Resource transfer identification information of the resource transferor is obtained, wherein the resource transfer identification information corresponds to a transferor account of the resource transferor. Based on the resource transfer identification information, information about the transferor account and a reference image corresponding to the transferor account are obtained. In response to determining that the face image corresponds to the reference image, a resource of the resource transferor is transferred based on the information about the transferor account.

17 Claims, 15 Drawing Sheets

(58) Field of Classification Search
USPC .......................................................... 705/44
See application file for complete search history.

(56) References Cited

U.S. PATENT DOCUMENTS

| | | | | |
|---|---|---|---|---|
| 9,729,865 | B1* | 8/2017 | Kuo | G06K 9/00268 |
| 10,015,795 | B1* | 7/2018 | Wolf | G06F 21/31 |
| 10,027,883 | B1* | 7/2018 | Kuo | G06K 9/00295 |
| 10,346,675 | B1* | 7/2019 | Nagalla | G06Q 20/18 |
| 10,354,126 | B1* | 7/2019 | Nagalla | G06K 9/00335 |
| 10,579,783 | B1* | 3/2020 | Aument | G06K 9/00912 |
| 2009/0140838 | A1 | 6/2009 | Newman et al. | |
| 2013/0307670 | A1* | 11/2013 | Ramaci | G06F 21/32 |
| | | | | 340/5.82 |
| 2014/0101611 | A1* | 4/2014 | Lang | G06F 3/04842 |
| | | | | 715/813 |
| 2014/0330729 | A1* | 11/2014 | Colangelo | G06Q 20/40145 |
| | | | | 705/72 |
| 2015/0026060 | A1* | 1/2015 | Krietzman | G06Q 20/3221 |
| | | | | 705/44 |
| 2015/0120562 | A1 | 4/2015 | Zhang | |
| 2015/0199702 | A1* | 7/2015 | Singh | G06Q 30/0226 |
| | | | | 705/14.27 |
| 2015/0339671 | A1* | 11/2015 | Krietzman | G06Q 20/102 |
| | | | | 705/44 |
| 2015/0348045 | A1* | 12/2015 | Agarwal | G06K 9/00248 |
| | | | | 705/44 |
| 2015/0356527 | A1* | 12/2015 | Pierce | G07F 19/211 |
| | | | | 705/43 |
| 2015/0356563 | A1* | 12/2015 | Vohra | G06Q 20/40145 |
| | | | | 705/44 |
| 2016/0019547 | A1* | 1/2016 | Gurnani | G06Q 20/40145 |
| | | | | 705/44 |
| 2016/0063235 | A1 | 3/2016 | Tussy | |
| 2016/0071071 | A1* | 3/2016 | Lazay | G06Q 20/10 |
| | | | | 705/39 |
| 2016/0071097 | A1* | 3/2016 | Lazay | G06Q 20/10 |
| | | | | 705/39 |
| 2016/0071099 | A1* | 3/2016 | Lazay | G06Q 20/10 |
| | | | | 705/44 |
| 2016/0071109 | A1* | 3/2016 | Lazay | G06Q 20/40145 |
| | | | | 705/44 |
| 2016/0071110 | A1* | 3/2016 | Lazay | G06Q 20/40145 |
| | | | | 705/44 |
| 2016/0125383 | A1* | 5/2016 | Chan | G06Q 20/3224 |
| | | | | 705/39 |
| 2016/0224774 | A1* | 8/2016 | Pender | G06F 21/32 |
| 2016/0239832 | A1* | 8/2016 | Knorr | H04L 63/02 |
| 2016/0240050 | A1* | 8/2016 | Block | G07F 19/211 |
| 2017/0061150 | A1 | 3/2017 | Fu et al. | |
| 2017/0063932 | A1* | 3/2017 | Hubbard | H04L 63/0861 |
| 2017/0161717 | A1* | 6/2017 | Xing | G06Q 20/3274 |
| 2017/0178141 | A1* | 6/2017 | Sancak | G06Q 20/4012 |
| 2017/0193480 | A1 | 7/2017 | Chandrasekaran et al. | |
| 2017/0193501 | A1* | 7/2017 | Cole | G06Q 20/401 |
| 2017/0195993 | A1* | 7/2017 | Cole | H04W 72/02 |
| 2017/0195994 | A1* | 7/2017 | Cole | H04W 76/10 |
| 2017/0243213 | A1* | 8/2017 | Castinado | G06Q 20/327 |
| 2017/0323279 | A1* | 11/2017 | Dion | G07F 19/20 |
| 2017/0323299 | A1* | 11/2017 | Davis | G06Q 20/204 |
| 2017/0357956 | A1* | 12/2017 | Borkar | G06Q 20/385 |
| 2017/0357969 | A1* | 12/2017 | Huang | G06Q 20/40 |
| 2017/0364898 | A1* | 12/2017 | Ach, II | G06Q 20/10 |
| 2018/0005272 | A1* | 1/2018 | Todasco | G06K 9/00302 |
| 2018/0012316 | A1* | 1/2018 | Huang | G06Q 20/40 |
| 2018/0032997 | A1* | 2/2018 | Gordon | G06Q 20/3224 |
| 2018/0039990 | A1* | 2/2018 | Lindemann | G06F 21/31 |
| 2018/0046993 | A1* | 2/2018 | Diamond | G06Q 20/10 |
| 2018/0053190 | A1* | 2/2018 | Gurunathan | G06Q 20/388 |
| 2018/0078843 | A1* | 3/2018 | Tran | A61B 5/6895 |
| 2018/0114207 | A1* | 4/2018 | Budde | G06Q 20/1085 |
| 2018/0174146 | A1* | 6/2018 | Bansal | G06Q 20/40145 |
| 2018/0218355 | A1* | 8/2018 | Lee | G06Q 20/29 |
| 2018/0225665 | A1* | 8/2018 | Lee | G06Q 20/3223 |
| 2018/0240120 | A1* | 8/2018 | Nicoletti | G06Q 20/40145 |
| 2018/0276769 | A1* | 9/2018 | Mizon | G06Q 50/12 |
| 2018/0285879 | A1* | 10/2018 | Gadnis | H04L 9/3231 |
| 2018/0295137 | A1* | 10/2018 | Zager | H04L 63/0853 |
| 2018/0351929 | A1* | 12/2018 | Kohli | G06Q 20/363 |
| 2018/0374065 | A1* | 12/2018 | Wolf | G06Q 20/0855 |
| 2019/0080188 | A1* | 3/2019 | Zhou | G06K 9/00281 |
| 2019/0080189 | A1* | 3/2019 | Van Os | G06K 9/00288 |
| 2019/0294900 | A1* | 9/2019 | Li | G06K 9/00892 |

FOREIGN PATENT DOCUMENTS

| | | |
|---|---|---|
| CN | 104361493 | 2/2015 |
| CN | 104537534 | 4/2015 |
| CN | 105740775 | 7/2016 |
| CN | 106204033 | 12/2016 |
| CN | 106339931 | 1/2017 |
| CN | 106651340 | 5/2017 |
| CN | 106875191 | 6/2017 |
| CN | 106934625 | 7/2017 |
| CN | 106991377 | 7/2017 |
| CN | 107093066 | 8/2017 |
| CN | 107679861 | 2/2018 |
| EP | 2993619 | 3/2016 |
| JP | 2007226319 | 9/2007 |
| JP | 2007304801 | 11/2007 |
| JP | 2012069133 | 4/2012 |
| JP | 2013140440 | 7/2013 |
| JP | 2015162185 | 9/2015 |
| JP | 2017033271 | 2/2017 |
| JP | 2017073062 | 4/2017 |
| TW | M455923 | 6/2013 |
| TW | 201337821 | 9/2013 |
| TW | M541071 | 5/2017 |
| WO | WO 2013178103 | 12/2013 |
| WO | WO 2015062229 | 5/2015 |
| WO | WO 2015062290 | 5/2015 |
| WO | WO 2016176517 | 11/2016 |

OTHER PUBLICATIONS

Crosby et al., "BlockChain Technology: Beyond Bitcoin," Sutardja Center for Entrepreneurship & Technology Technical Report, Oct. 16, 2015, 35 pages.
International Search Report and Written Opinion in International Application No. PCT/CN2018/103001, dated Dec. 5, 2018, 10 pages (with partial English Translation).
Nakamoto, "Bitcoin: A Peer-to-Peer Electronic Cash System," www.bitcoin.org, 2005, 9 pages.
PCT International Preliminary Report on Patentability in International Application No. PCT/CN2018/103001, dated Mar. 3, 2020, 10 pages (with English translation).
Extended European Search Report in European Application No. 18852642.0, dated Apr. 17, 2020, 7 pages.

\* cited by examiner

RESOURCE TRANSFER METHOD, FUND PAYMENT METHOD, AND ELECTRONIC DEVICE

CROSS-REFERENCE TO RELATED APPLICATIONS

This application is a continuation of PCT Application No. PCT/CN2018/103001, filed on Aug. 29, 2018, which claims priority to Chinese Patent Application No. 201710765152.4, filed on Aug. 30, 2017, and each application is hereby incorporated by reference in its entirety.

TECHNICAL FIELD

The present application relates to the field of computer technologies, and in particular, to a resource transfer method, a fund payment method, and an electronic device.

BACKGROUND

With rapid development of computer communications technologies, people's production and life increasingly need to rely on an Internet platform for resource transfer and allocation. To ensure security of a resource and legality of resource transfer, in an existing resource transfer process, identity verification often needs to be performed based on personal information provided by a resource transferor or with the aid of a hardware facility.

For example, the resource is big data information, and the resource transfer is big data information transfer. During big data transfer, to ensure legality of an identity of a data transferor, the data transferor may need to enter identity information such as a user name or a password of the data transferor, show a two-dimensional code that is displayed on a mobile terminal and that represents a legal identity of the data transferor, or access a hardware facility (for example, a USB key) that represents a legal identity of the data transferor, to facilitate identity verification on the Internet platform. When the information about the data transferor or the hardware facility is embezzled, the resource is likely to be illegally transferred. Alternatively, when the data transferor forgets the identity information or does not carry the hardware facility, the resource cannot be normally transferred, either.

Therefore, a method that can be used to safely, conveniently, and quickly transfer a resource is urgently needed.

SUMMARY

Implementations of the present application provide a resource transfer method, and an electronic device, so that a resource can be safely, conveniently, and quickly transferred.

The implementations of the present application further provide a fund payment method, and an electronic device, so that a fund can be safely, conveniently, and quickly paid.

The following technical solutions are used in the implementations of the present application.

According to a first aspect, an implementation of the present application provides a resource transfer method, including: obtaining a face image of a resource transferor, where the face image is used to authenticate an identity of the resource transferor, and obtaining resource transfer identification information of the resource transferor, where the resource transfer identification information corresponds to a transferor account of the resource transferor; determining, based on the resource transfer identification information, information about the transferor account and a reference image corresponding to the transferor account; and transferring a resource of the resource transferor based on the information about the transferor account when the face image matches the reference image.

According to a second aspect, an implementation of the present application provides a fund payment method, including: obtaining a face image of a payer, where the face image is used to authenticate an identity of the payer, and obtaining fund payment identification information of the payer, where the fund payment identification information corresponds to a payer account of the payer; determining, based on the fund payment identification information, information about the payer account and a reference image corresponding to the payer account; and transferring a fund of the payer based on the information about the payer account when the face image matches the reference image.

Preferably, in the method according to the second aspect provided in this implementation of the present application, after the obtaining a face image of a payer, and before the obtaining fund payment identification information of the payer, the method further includes: searching a face recognition permission restricted list for face image information that matches the face image, where the face recognition permission restricted list is used to store information about a face image whose face image recognition permission is restricted; and the obtaining fund payment identification information of the payer includes: obtaining the fund payment identification information of the payer when the face image information that matches the face image does not exist in the face recognition permission restricted list.

Preferably, in the method according to the second aspect provided in this implementation of the present application, after the obtaining a face image of a payer, and before the obtaining fund payment identification information of the payer, the method further includes: obtaining identification information of a device that collects the face image; and the obtaining fund payment identification information of the payer includes: obtaining the fund payment identification information of the payer when the identification information of the device indicates that the device is legal.

Preferably, in the method according to the second aspect provided in this implementation of the present application, the obtaining the fund payment identification information of the payer when the identification information of the device indicates that the device is legal includes: determining an information type of the needed fund payment identification information based on the identification information of the device when the identification information of the device indicates that the device is legal; and obtaining the fund payment identification information of the payer based on the information type.

Preferably, in the method according to the second aspect provided in this implementation of the present application, the determining an information type of the needed fund payment identification information based on the identification information of the device includes: determining, based on the identification information of the device, a set of hotspot users corresponding to the device, where the set of hotspot users includes user hotspot information associated with the device; matching the face image of the payer with the user hotspot information; and determining that the needed fund payment identification information is first information if the face image of the payer matches the user hotspot information; otherwise, determining that the needed fund payment identification information is second information, where security of the second information is higher than security of the first information.

Preferably, in the method according to the second aspect provided in this implementation of the present application, the second information is personal identity information of the payer, received fund payment verification information, or order information associated with the fund to be transferred, and the first information is a part of the second information; or the second information is biometric feature information of the payer, and the first information is personal identity information of the payer, received fund payment verification information, or order information associated with the fund to be transferred.

Preferably, in the method according to the second aspect provided in this implementation of the present application, the obtaining a face image of a payer includes: obtaining the face image of the payer by using a 3D photographing apparatus.

Preferably, in the method according to the second aspect provided in this implementation of the present application, the fund payment identification information includes one or more types of the following: the personal identity information of the payer; the biometric feature information of the payer; the fund payment verification information received by the payer; and the order information associated with the fund to be transferred.

Preferably, in the method according to the second aspect provided in this implementation of the present application, the determining, based on the fund payment identification information, information about the payer account and a reference image corresponding to the payer account includes: determining, based on the fund payment identification information, the information about the payer account corresponding to the fund payment identification information; and determining, based on the information about the payer account, the reference image corresponding to the payer account.

Preferably, in the method according to the second aspect provided in this implementation of the present application, the determining, based on the fund payment identification information, the information about the payer account corresponding to the fund payment identification information includes: identifying, based on the fund payment identification information, information about multiple payer accounts corresponding to the fund payment identification information; and the determining, based on the information about the payer account, the reference image corresponding to the payer account includes: when the information about the multiple payer accounts corresponds to the same reference image, determining the reference image as the reference image corresponding to the payer account.

Preferably, in the method according to the second aspect provided in this implementation of the present application, the transferring a fund based on the information about the payer account, the method further includes: storing the face image of the payer as an adjusted reference image corresponding to the payer account, to match the re-obtained face image of the payer and perform fund transfer again.

Preferably, in the method according to the second aspect provided in this implementation of the present application, before the transferring a fund of the payer based on the information about the payer account when the face image matches the reference image, the method further includes: matching the face image with the reference image when the information about the payer account satisfies a predetermined condition.

Preferably, in the method according to the second aspect provided in this implementation of the present application, the predetermined condition includes at least one of the following: a type of the payer account is an account type that has a permission for face image recognition; the payer account is not included in an illegal-account list; a quantity of fund payment failures of the payer account does not reach a predetermined value; and a geographical location state of the payer account is a normal state.

According to a third aspect, an implementation of the present application provides a resource transfer apparatus, including: a face image acquisition module, configured to obtain a face image of a resource transferor, where the face image is used to authenticate an identity of the resource transferor; an identification information acquisition module, configured to obtain resource transfer identification information of the resource transferor, where the resource transfer identification information corresponds to a transferor account of the resource transferor; an account information acquisition module, configured to determine, based on the resource transfer identification information, information about the transferor account and a reference image corresponding to the transferor account; and a resource transfer module, configured to transfer a resource of the resource transferor based on the information about the transferor account when the face image matches the reference image.

According to a fourth aspect, an implementation of the present application provides an electronic device, including: a processor; and a storage, configured to store a computer executable instruction, where when the executable instruction is executed, the processor is enabled to perform the following operations: obtaining a face image of a resource transferor, where the face image is used to authenticate an identity of the resource transferor, and obtaining resource transfer identification information of the resource transferor, where the resource transfer identification information corresponds to a transferor account of the resource transferor; determining, based on the resource transfer identification information, information about the transferor account and a reference image corresponding to the transferor account; and transferring a resource of the resource transferor based on the information about the transferor account when the face image matches the reference image.

According to a fifth aspect, an implementation of the present application provides a fund payment apparatus, including: a face image acquisition module, configured to obtain a face image of a payer, where the face image is used to authenticate an identity of the payer; an identification information acquisition module, configured to obtain fund payment identification information of the payer, where the fund payment identification information corresponds to a payer account of the payer; an account information acquisition module, configured to determine, based on the fund payment identification information, information about the payer account and a reference image corresponding to the payer account; and a fund payment module, configured to transfer a fund of the payer based on the information about the payer account when the face image matches the reference image.

According to a sixth aspect, an implementation of the present application provides an electronic device, including: a processor; and a storage, configured to store a computer executable instruction, where when the executable instruction is executed, the processor is enabled to perform the following operations: obtaining a face image of a payer, where the face image is used to authenticate an identity of the payer, and obtaining fund payment identification information of the payer, where the fund payment identification information corresponds to a payer account of the payer; determining, based on the fund payment identification information, information about the payer account and a reference image corresponding to the payer account; and transferring a fund of the payer based on the information about the payer account when the face image matches the reference image.

At least one of the previous technical solutions used in the implementations of the present application can achieve the following beneficial effects:

In the implementations of the present application, the corresponding transferor account and reference image are identified based on the resource transfer identification information of the resource transferor, and the face image of the resource transferor is compared with the reference image to implement authentication on the identity of the resource transferor. Therefore, the resource is transferred based on the information about the transferor account when the face image matches the reference image.

According to the technical solutions provided in the implementations of the present application, the account information and the reference image of the resource transferor are identified by using the resource transfer identification information, and identity authentication is performed by using the face image inherent to the resource transferor. It can alleviate a potential resource transfer security risk caused by embezzlement of authentication information such as a user name or a password of the resource transferor or a loss of a hardware facility, such as a U shield, used for authentication. In addition, the resource exporter can more conveniently and quickly transfer the resource without additionally recording or carrying information or a facility for authentication.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF IMPLEMENTATIONS

To make the objectives, technical solutions, and advantages of the present application clearer, the following clearly describes the technical solutions of the present application with reference to specific implementations of the present application and corresponding accompanying drawings. Apparently, the described implementations are merely some rather than all of the implementations of the present application. All other implementations obtained by a person of ordinary skill in the art based on the implementations of the present application without creative efforts shall fall within the protection scope of the present application.

The technical solutions provided in the implementations of the present application are described in detail below with reference to the accompanying drawings.

The implementations of the present application provide a resource transfer method. In a resource transfer process, a resource transferor, a resource transferee, and a server interact with each other. Generally, both the resource transferor and the resource transferee are users registered in the server.

Figure 1:
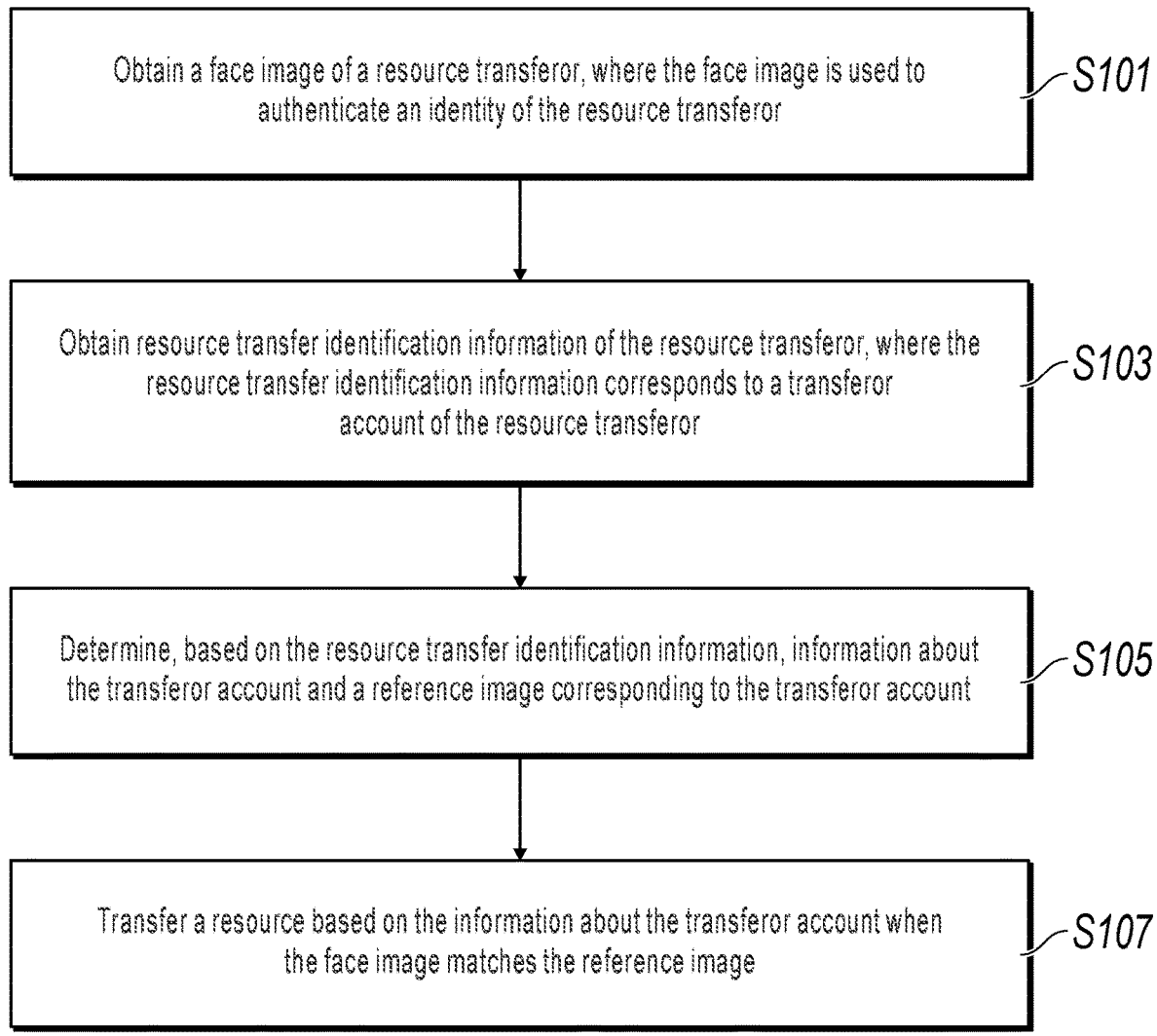
FIG. 1 is a schematic flowchart illustrating a first resource transfer method, according to an implementation of the present application.

Referring to FIG. 1, an implementation of the present application provides a resource transfer method. The method is applicable to a server and can specifically include the following steps:

S101. Obtain a face image of a resource transferor, where the face image is used to authenticate an identity of the resource transferor.

S103. Obtain resource transfer identification information of the resource transferor, where the resource transfer identification information corresponds to a transferor account of the resource transferor.

S105. Determine, based on the resource transfer identification information, information about the transferor account and a reference image corresponding to the transferor account.

S107. Transfer a resource based on the information about the transferor account when the face image matches the reference image.

In an application scenario, if the resource transferor wants to transfer the resource, the resource transferor can upload the face image of the resource transferor to a server with the aid of a face image collection device disposed on a resource transferee, so that the server can obtain the face image of the resource transferor, and then authenticate the identity of the resource transferor. In addition, the resource transferor can further send identification information, namely, the resource transfer identification information, corresponding to the transferor account to the server, so that the server determines the information about the transferor account and the reference image corresponding to the transferor account. On this basis, the server matches the face image uploaded by the resource transferor with the reference image that is stored in the server and that corresponds to the transferor account. When the face image matches the reference image, the server can understand that the resource transferor that currently initiates resource transfer is consistent with a legal resource transferor recorded in the server. Therefore, the server can transfer the resource currently to be transferred from the resource transferor to the resource transferee based on the information about the transferor account.

Preferably, a 3D photographing apparatus is used to obtain the face image of the resource transferor. Further, a face image depth threshold can be set to exclude a face image whose depth of field is less than the depth threshold, to implement living detection and ensure that the server obtains an actual living image, instead of obtaining a non-living image with the aid of a photo, a model, etc. It helps to prevent a resource from being illegally transferred due to a living attack, thereby ensuring security of the resource.

It is worthwhile to note that, when initiating the resource transfer, the resource transferor can enter the resource transfer identification information of the resource transferor, so that the server identifies the transferor account that is stored in the server and that corresponds to the resource transfer identification information, and then the server can determine the place that the resource is to be transferred from. To achieve this objective, various types of identification information corresponding to the transferor account of the resource transferor in the server all can be used as specific content of the resource transfer identification information, provided that a configuration demand of the server is satisfied. Further, the correspondence can be a direct correspondence or an indirect correspondence, and can be a one-to-one correspondence or a one-to-many correspondence. The various types of identification information can be used separately or in combination, provided that the server can identify the transferor account of the resource transferor based on the resource transfer identification information.

More specifically, the resource transfer identification information can be information that represents a personal identity of the user, such as a mobile number, an ID card number, or a user name; or can be another type of inherent biometric feature information different from the face image, such as a fingerprint, an iris, or a voiceprint; or can be resource transfer verification information delivered by the server and received by the user, such as a verification code sent to a user terminal; or can be a pre-agreed behavior feature such as a specific expression, a specific posture, or a specific gesture. Alternatively, the resource transfer identification information can be identification information associated with a transaction corresponding to the resource to be transferred, such as an order number, or a verification code received by the user when the user generates an order.

It should be further noted that in this implementation of the present application, a sequence in which the user enters the face image and the resource transfer identification information into the server may not be limited. Similarly, a sequence in which the server obtains the face image and the resource transfer identification information of the resource transferor can also be determined based on an actual application scenario and a specific interaction process, and is not specifically limited in this implementation of the present application. In addition, during specific implementation, the face image and the resource transfer identification information can be directly obtained, or can be obtained only when a certain verification condition is satisfied. For example, the face image can be first obtained, and then the resource transfer identification information can be obtained when a certain condition (which can be a single condition or a combination of multiple conditions) is satisfied. The following uses examples for description.

Figure 2:
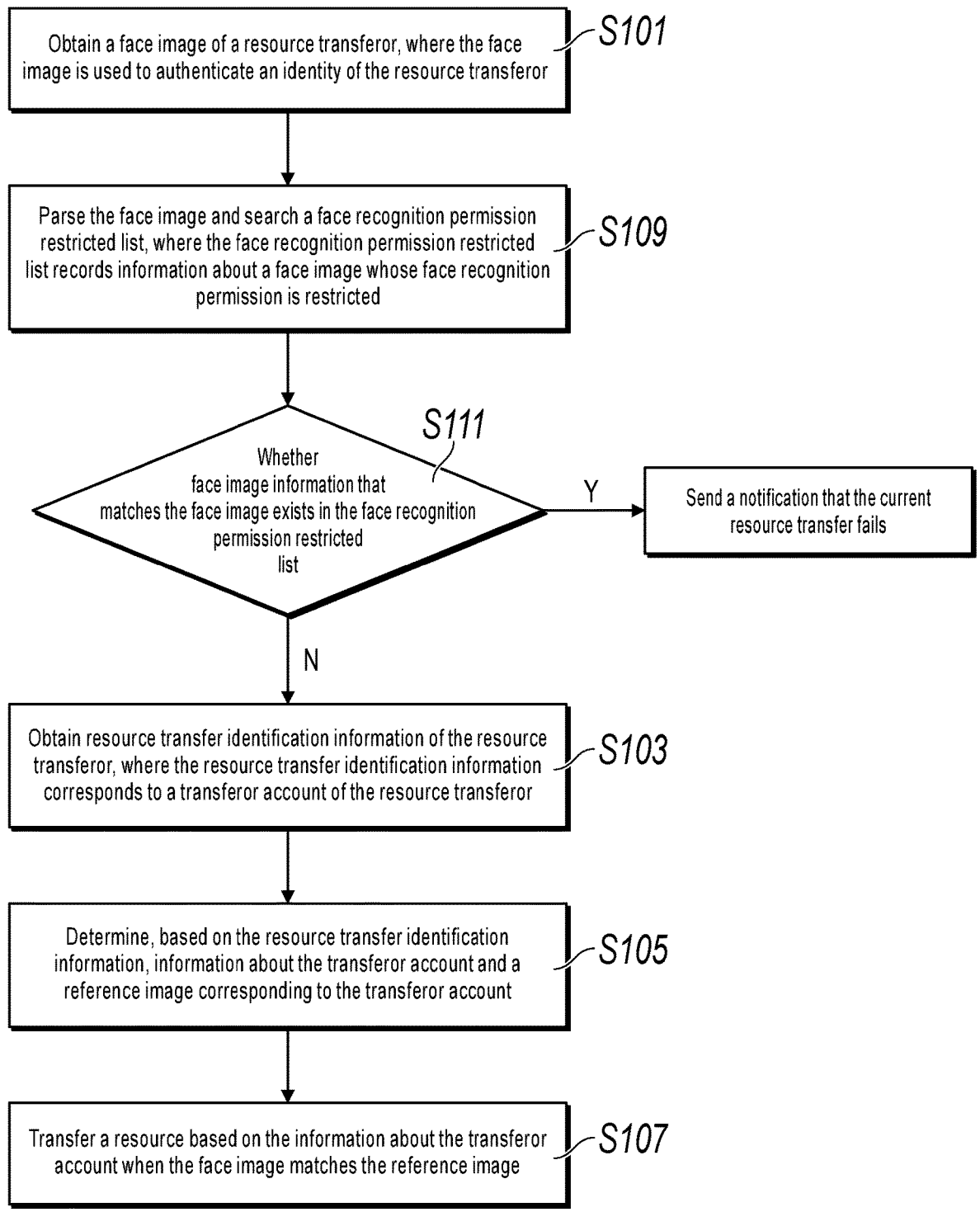
FIG. 2 is a schematic flowchart illustrating a second resource transfer method, according to an implementation of the present application.

(1) Referring to FIG. 2, the server first performs step S101 of obtaining the face image of the resource transferor, and then performs step S109 of parsing the face image and searching a face recognition permission restricted list, where the face recognition permission restricted list records information about a face image whose face recognition permission is restricted. When determining, based on determining in step S111, that the obtained face image is included in the face recognition permission restricted list, the server can understand that a use permission of the face image is restricted, and the server disallows the resource transferor to use the face image for identity authentication. Therefore, the user does not need to upload other information, and the server can directly return a message that the current resource transfer fails. When determining, based on determining in step S111, that the obtained face image is not included in the face recognition permission restricted list, the server continues to perform step 103 of obtaining the resource transfer identification information of the resource transferor.

It is worthwhile to note that, the face image information recorded in the face recognition permission restricted list can be from a face image that appears frequently in a short time or a face image whose quantity of authentication failures reaches a predetermined threshold. It can be understood that such a face image is likely to be abnormal or illegal in use. Therefore, the server records such a face image in the face recognition permission restricted list to ensure security of a resource.

(2) When obtaining the face image of the resource transferor, the server can further obtain identification information of a device that collects the face image. The identification information of the device can specifically include a brand of the device, disposition location information of the device, a number of the device, etc. It can be understood that identification information of a legal device is recorded in the server, and therefore the server can compare the received identification information of the device with the identification information of the legal device, to verify legality of the device that collects the face image. When the identification information of the device indicates that the device is legal, the server further obtains the resource transfer identification information of the resource transferor.

It can be understood that, alternatively, the server can first directly obtain the resource transfer identification information, and then obtain the face image of the user for authentication after specific condition-based verification succeeds, for example, after the server identifies information about a legal resource transferor account based on the resource transfer identification information. A specific implementation process can be determined based on an actual service demand.

It is worthwhile to note that, the device configured to collect the face image of the resource transferor is usually the face image collection device disposed on the resource transferee. Uploading the identification information of the device to the server not only helps determine legality of the face image collection device, but also helps collect transaction information of the resource transferee (which can be specifically represented as a shop in a commodity transaction), and further helps collect information about a geographical location at which the resource transferor initiates the resource transfer, to facilitate transaction risk evaluation.

Because the device that collects the face image of the resource transferor corresponds to the resource transferee, after obtaining the identification information of the device, the server can identify the device that collects the face image, and then can identify configuration information of the resource transferee. When the identification information of the device indicates that the device is legal, an information type of the needed resource transfer identification information can be determined based on the identification information of the device, and then the resource transfer identification information of the resource transferor is obtained based on the information type.

More specifically, the resource transferee can construct a set of hotspot users associated with the deployed face image collection device, and can further continuously update users in the set of hotspot users and information about the users. During construction and updating of the set of hotspot users: (1) the resource transferee can record, in the set of hotspot users, information that is submitted by the user for member registration at the resource transferee, for example, biometric feature information, such as the face image, the fingerprint, or the iris of the user, submitted by the user to the resource transferee; or (2) the resource transferee can record, for example, a user who uploads a face image with the aid of the face image collection device and successfully transfers a resource to the resource transferee in the set of hotspot users based on historical information of an Internet transaction performed by the user with the aid of the face image collection device of the resource transferee; or (3) the resource transferee can collect information about mobile terminals around the face image collection device by using a Wi-Fi probe technology, and record information corresponding to a mobile terminal that appears multiple times around the device in the set of hotspot users. In case (3), it can be understood that a user corresponding to the mobile terminal frequently appears around the device, and therefore is more likely to transfer a resource with the aid of the face image collection device. It is worthwhile to note that, user hotspot information in the set of hotspot users can include the content in the previous multiple aspects, or can include information that can reflect another aspect of association relationship between the resource transferor and the collection device. In an application scenario, the user hotspot information includes face information of a hotspot user, other biometric feature information of the hotspot user, a MAC address of a mobile terminal held by the hotspot user, and an account registered by the hotspot user in the server. In this case, a correspondence among the four pieces of information is established in the set of hotspot users that is of the resource transferee and that corresponds to the collection device.

Figure 3:
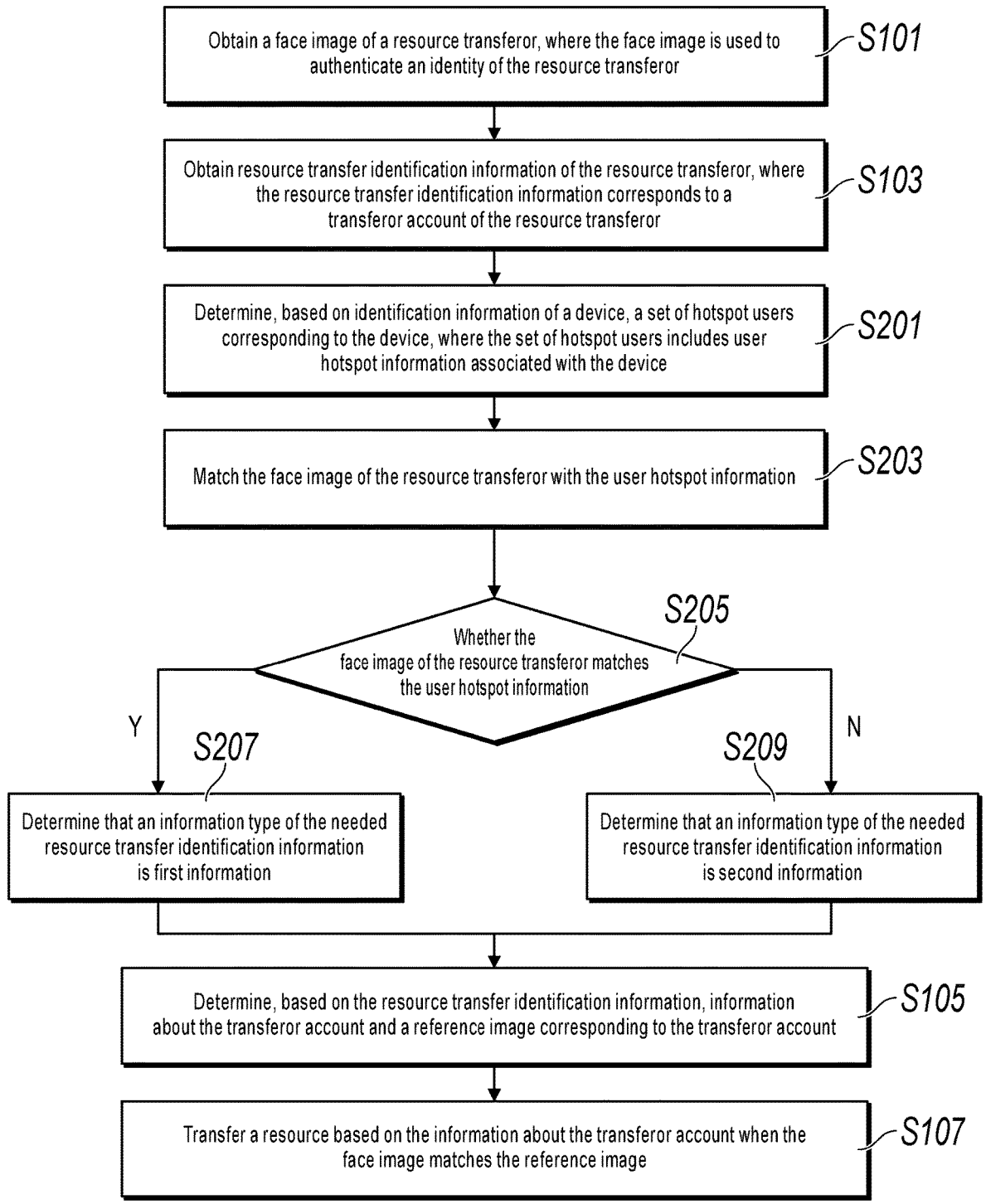
FIG. 3 is a schematic flowchart illustrating a third resource transfer method, according to an implementation of the present application.

The meaning of the user hotspot information included in the set of hotspot users and the association relationship between the user hotspot information and the face image collection device are described above by using the examples. Based on this understanding, referring to FIG. 3, determining the information type of the needed resource transfer identification information based on the identification information of the device can specifically include the following steps:

S201. Determine, based on the identification information of the device, a set of hotspot users corresponding to the device, where the set of hotspot users includes user hotspot information associated with the device.

S203. Match the face image of the resource transferor with the user hotspot information.

S205. Determine whether the face image of the resource transferor matches the user hotspot information.

S207. Determine that the information type of the needed resource transfer identification information is first information if the face image of the resource transferor matches the user hotspot information.

S209. Determine that the information type of the needed resource transfer identification information is second information if the face image of the resource transferor does not match the user hotspot information.

Wherein, security of the second information is higher than security of the first information.

Specifically, the second information can be personal identity information of the resource transferor, received resource transfer verification information, or order information associated with the resource to be transferred. In this case, the first information can be a part of the second information. Alternatively, the second information can be biometric feature information of the resource transferor. In this case, the first information can be personal identity information of the resource transferor, received resource transfer verification information, or order information associated with the resource to be transferred.

More specifically, a process of matching the face image obtained by the server with the user hotspot information and determining the information type of the resource transfer identification information can be performed by using multi-factor cross-verification algorithm logic. Details are omitted here. When the face image obtained by the server matches the user hotspot information, it can be understood that the resource transferor that currently initiates the resource transfer is associated with the face image collection device disposed on the resource transferee. For example, the resource transferor successfully transfers a resource to the resource transferee previously, or the resource transferor has registered as a member at the resource transferee previously. In this case, it can be considered that credibility of resource transfer between the resource transferor and the resource transferee is relatively high, and therefore the resource transferor can be allowed to enter shorter information (namely, the first information) as the resource transfer identification information for authentication. On the contrary, the resource transferor can be required to enter more complete information (namely, the second information) as the resource transfer identification information for authentication. For example, if the face image of the resource transferor does not match the user hotspot information, the resource transferor needs to enter an 11-digit mobile number (equivalent to the second information) as the resource transfer identification information for authentication. If the face image of the resource transferor matches the user hotspot information, authentication can be performed provided that the resource transferor enters the last four digits (equivalent to the first information) of the mobile number. For another example, the second information can be an ID card number, and the first information can be a specified digit of the ID card number. In this solution, a resource transferor added to the set of hotspot users can more conveniently and quickly transfer a resource.

In the previous implementation, the first information is a part of the second information, so that the resource transferor that has established a certain association relationship with the resource transferee more conveniently and quickly transfers the resource. In addition, the first information and the second information can be different types of information, provided that security of the second information is higher than security of the first information. For example, the first information can be a mobile number of the resource transferor, and the second information can be an iris of the resource transferor. As a biological feature inherent to the resource transferor, the iris is less likely to be embezzled than the mobile number. Therefore, for a resource transferor that is not added to the set of hotspot users, the server can require the resource transferor to enter second information with higher security as resource transfer identification information. It is more helpful to ensure security of resource transfer.

A process in which the server obtains the face image and the resource transfer identification information that are entered by the resource transferor and the connotation of the information are described above by using the examples. After receiving the resource transfer identification information, the server can further determine, based on the resource transfer identification information, the information about the transferor account and the reference image corresponding to the transferor account, which can specifically include: determining, based on the resource transfer identification information, the information about the transferor account corresponding to the resource transfer identification information; and determining, based on the information about the transferor account, the reference image corresponding to the transferor account.

As described above, the resource transfer identification information corresponds to the transferor account of the resource transferor. Therefore, the server can identify the information about the corresponding transferor account by using the resource transfer identification information, and then the server can identify, based on the information about the transferor account, the reference image reserved by the resource transferor in the server. Here, the transferor account can be understood as an account registered by the resource transferor on an Internet platform that the server is located on, or can be understood as another account that is reserved by the resource transferor on the Internet platform and that is bound to a registered account of the platform. The reference image can be a face image uploaded by the resource transferor to the server for reservation when the resource transferor performs registration or opens a corresponding service, or a photo reserved on a certificate. For example, the reference image can be a photo on an ID card, or a face image on which living verification succeeds.

It is worthwhile to note that, the reference image stored in the server for reservation can be adjusted based on an actual application case in which the resource transferor transfers the resource by using the face image. For example, the face image of the resource transferor can be stored as an adjusted reference image corresponding to the transferor account, to match the re-obtained face image of the resource transferor and perform resource transfer again. As such, the Internet platform can collect a "near photo" of the resource transferor as a reference image. It helps improve a degree to which the reference image matches the face image of the resource transferor, and prevent resource transfer from being affected due to a change of the individual face image of the user, so that user experience is better.

In some application scenarios, when determining, based on the resource transfer identification information, the information about the transferor account corresponding to the resource transfer identification information, information about multiple transferor accounts corresponding to the resource transfer identification information may be identified. In this case, if a unique determined reference image corresponding to the information about the multiple transferor accounts can be identified, the reference image is determined as the reference image corresponding to the transferor account. On the contrary, if the information about the multiple transferor accounts corresponds to different reference images, it can be understood that the account corresponding to the resource transferor cannot be recognized from the multiple transferor accounts in the server, and the server can send, to the user, a notification that the resource transfer fails.

For example, the Internet platform may allow the same user (which is understood as the same entity in reality here, and can be represented as a user that performs registration by using the same ID card number) to register multiple accounts on the platform, and the multiple accounts may correspond to the same mobile number. Therefore, when the user enters the mobile number as resource transfer identification information, the server identifies the multiple accounts corresponding to the mobile number. In this case, the server can further determine whether the multiple accounts correspond to the same ID card number, and then determine whether a unique determined reference image can be identified.

Based on the previous implementation, when the obtained face image is matched with the reference image, and the obtained face image matches the reference image, before the resource of the resource transferor is transferred based on the information about the transferor account, the method provided in this implementation of the present application can further include: matching the face image with the reference image when the information about the transferor account satisfies a predetermined condition.

Specifically, the predetermined condition can include at least one of the following: a type of the transferor account is an account type that has a permission for face image recognition; the transferor account is not included in an illegal-account list; a quantity of resource transfer failures of the transferor account does not reach a predetermined value; and a geographical location state of the transferor account is a normal state.

In this implementation of the present application, the predetermined condition is used to reflect a risk control rule for resource transfer on the Internet platform. Before the obtained face image is authenticated, the information related to the transferor account is verified, to directly exclude a transferor account that does not conform to the risk control rule, thereby ensuring security of the resource transfer. For example, it is determined whether the type of the transferor account is the account type that has the face image recognition permission. If a determining result is "yes", it indicates that the transferor account is allowed to use the face image for authentication to transfer the resource. Therefore, the face image can be further compared with the reference image. If a determining result is "no", it indicates that the transferor account is not allowed to use the face image for authentication. Therefore, the server can feed back, to the user, a notification that the current resource transfer fails. For another example, the server can collect device information of the face image collecting device, to know information about a geographical location at which the resource transferor reports the face image, and then determine whether the geographic location state of the transferor account corresponding to the resource transferor is normal. If the geographic location state is normal, the server can continue to compare the face image with the reference image for resource transfer. If the geographic location state is abnormal, it indicates that the transferor account of the resource transferor may be illegally used. Therefore, the server can feed back, to the user, a notification that the current resource transfer fails. More specifically, the geographic location state of the transferor account can be determined based on times and places at which the resource transferor uploads the face image multiple times or based on configuration information (for example, a use range) reserved by the resource transferor in the server. Certainly, it should be understood that if the predetermined condition includes multiple conditions, only when the multiple conditions are all satisfied, it can be considered that the predetermined condition is satisfied.

Figure 4:
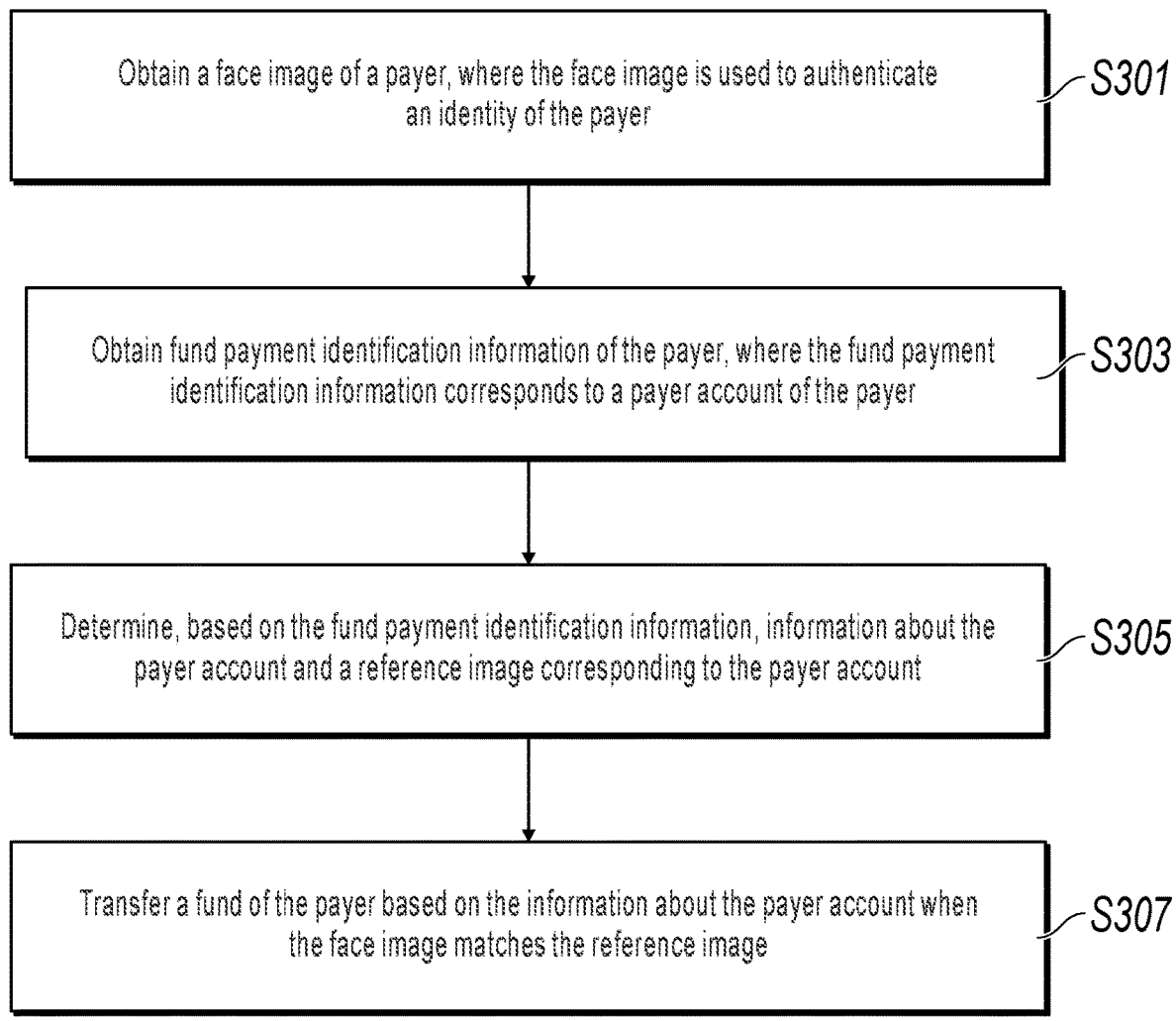
FIG. 4 is a schematic flowchart illustrating a fund payment method, according to an implementation of the present application.
Figure 5A:
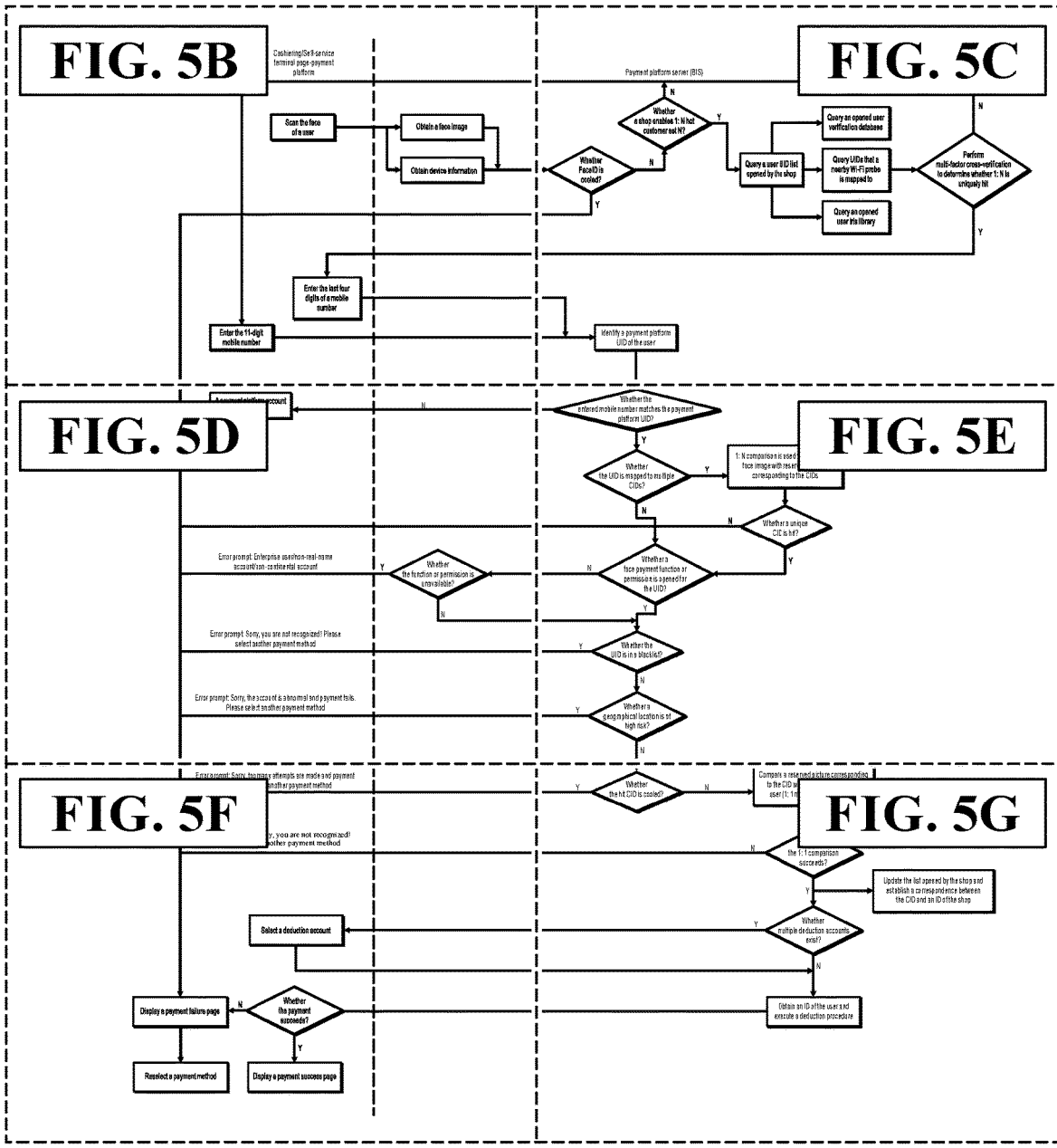
FIGS. 5A-5G are schematic interaction diagrams illustrating a fund payment method applied to fund payment, according to an implementation of the present application.
Figure 5B:
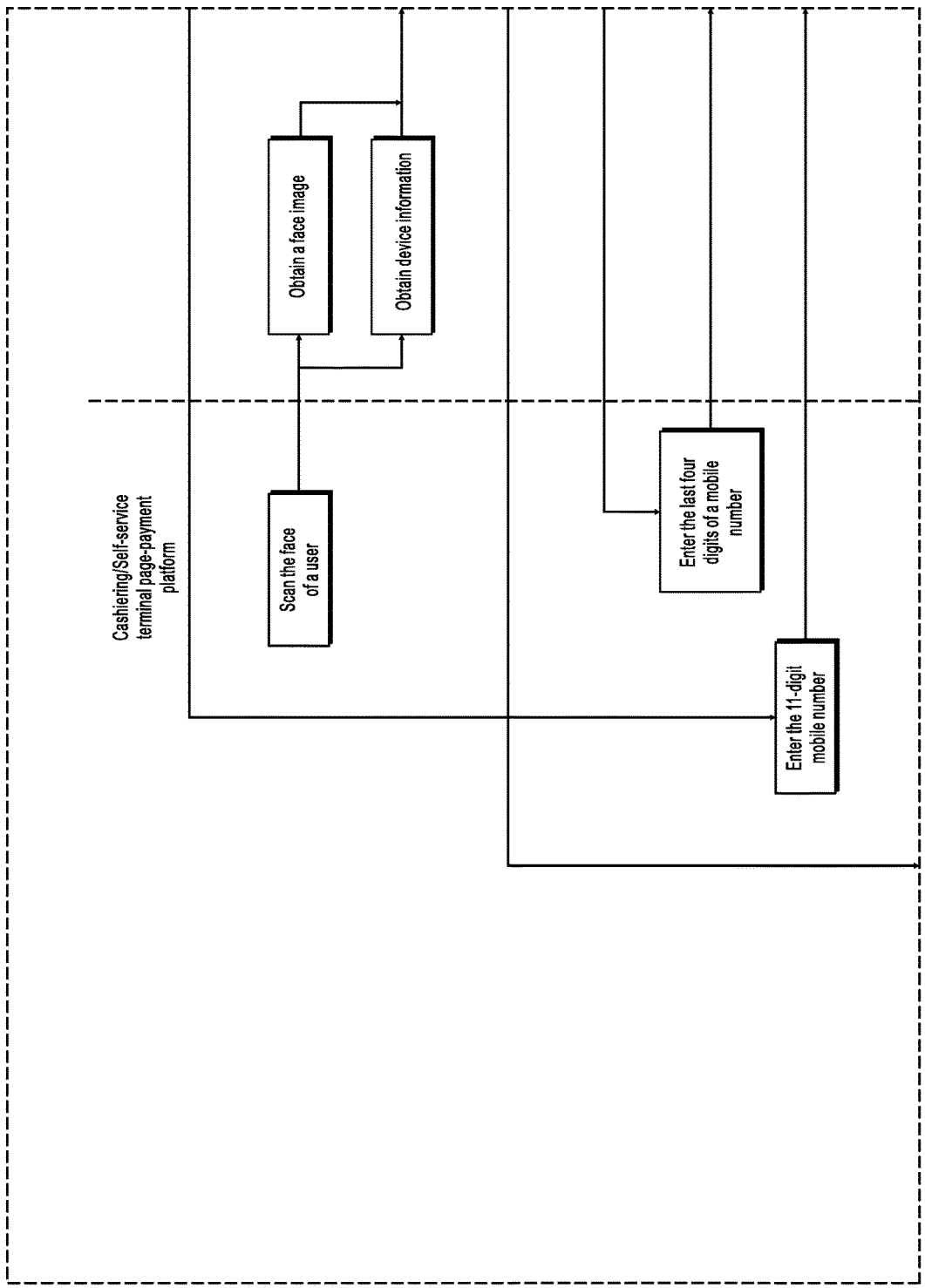
Figure 5C:
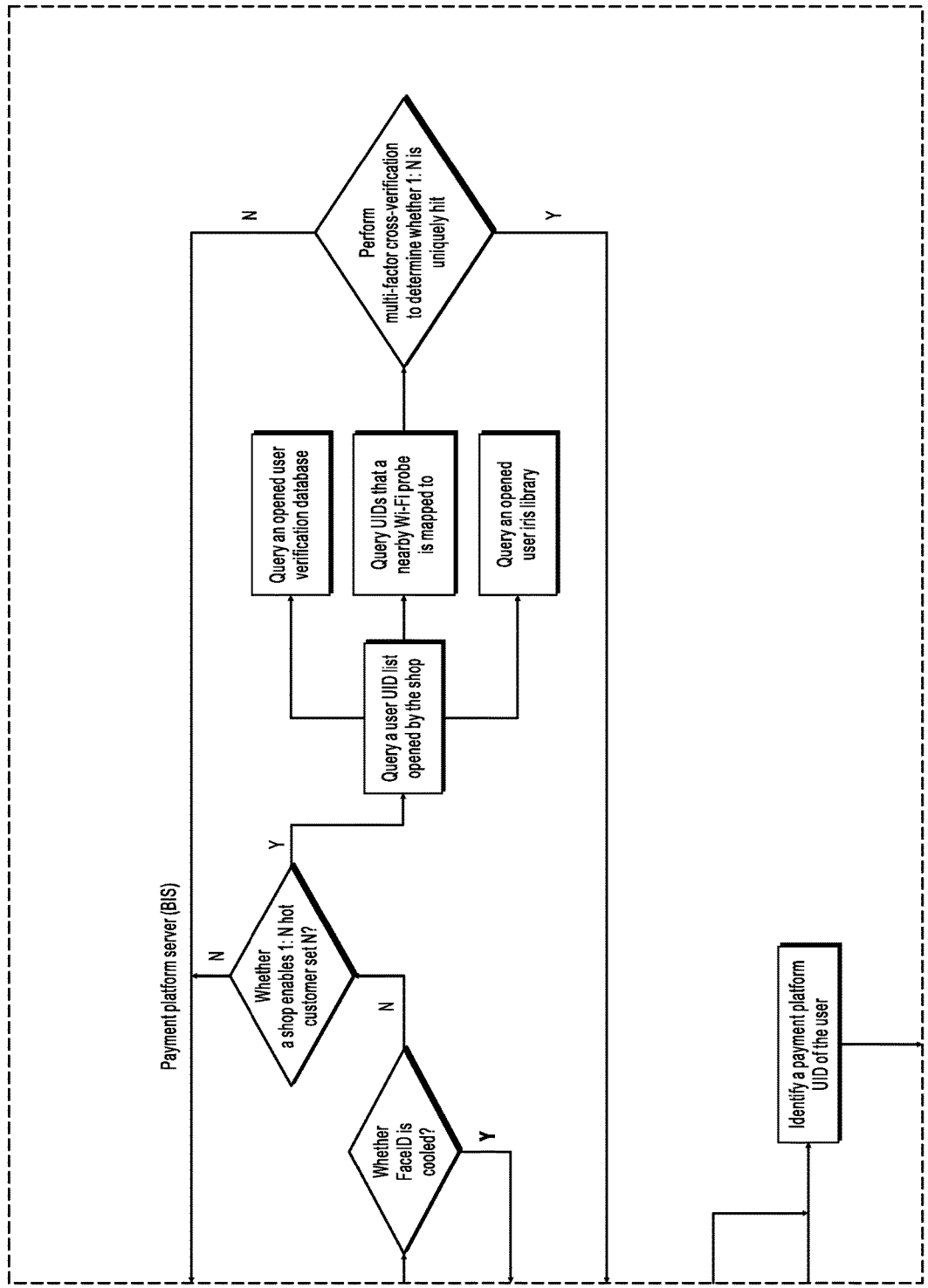
Figure 5D:
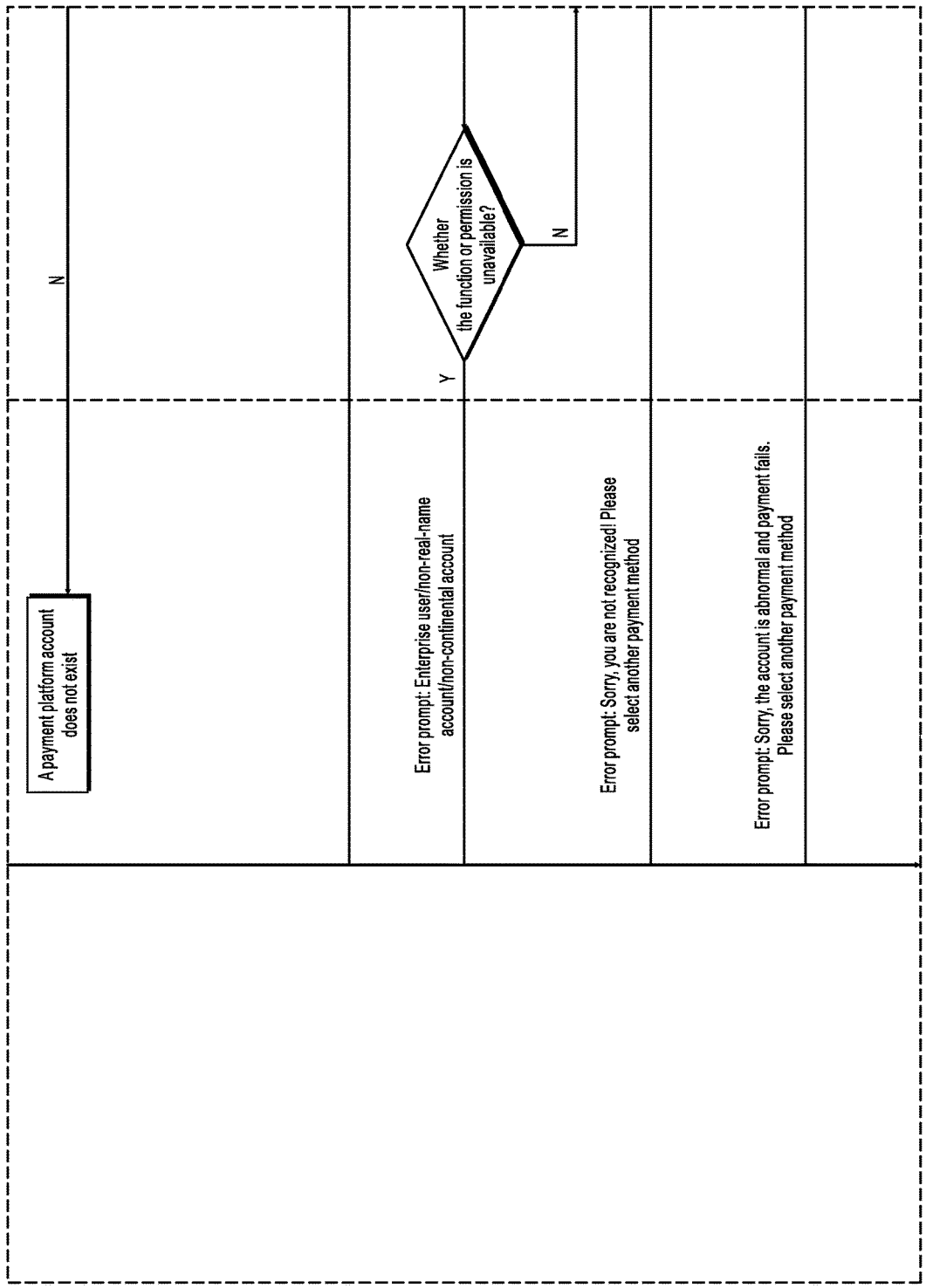
Figure 5E:
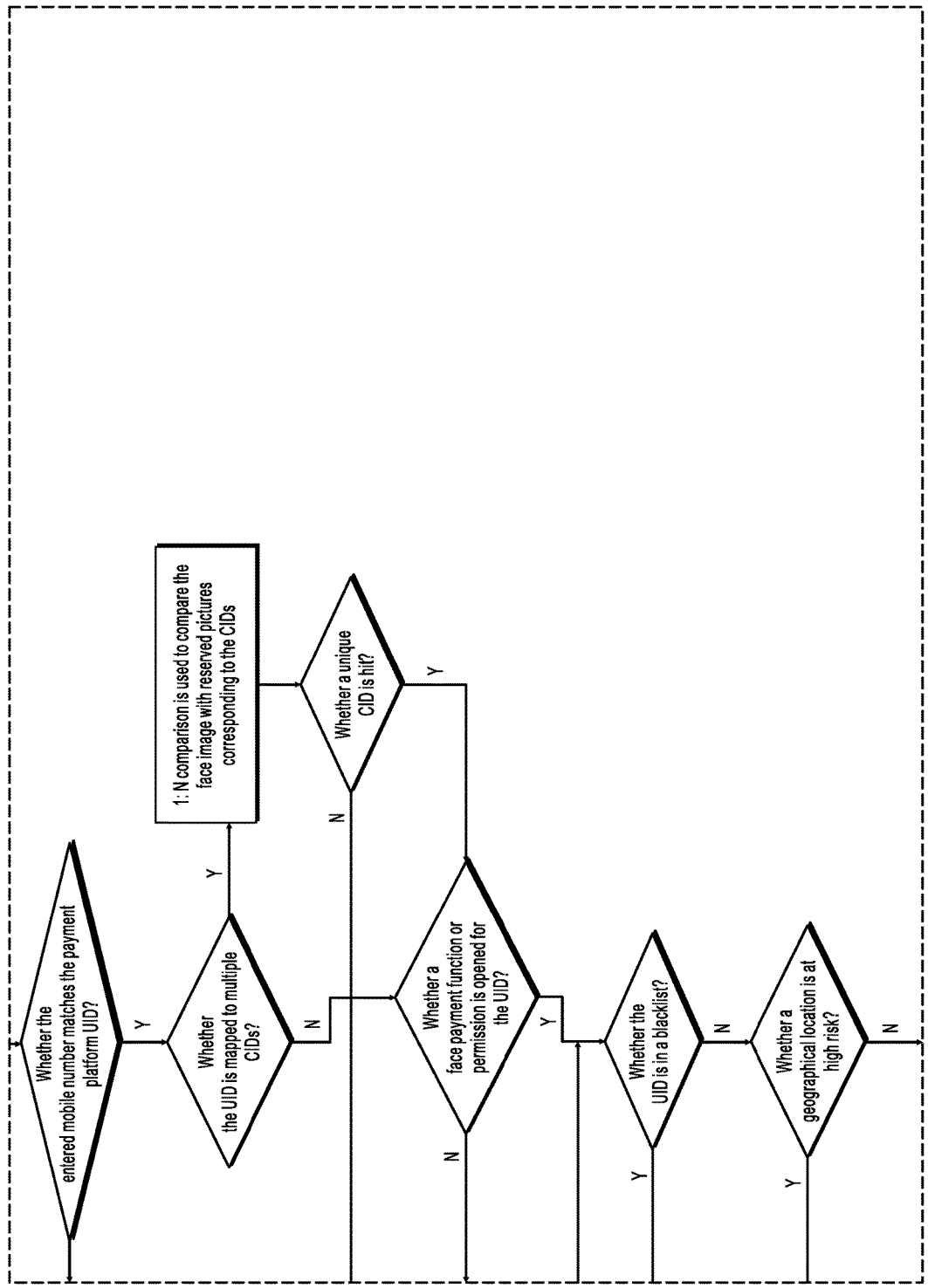
Figure 5F:
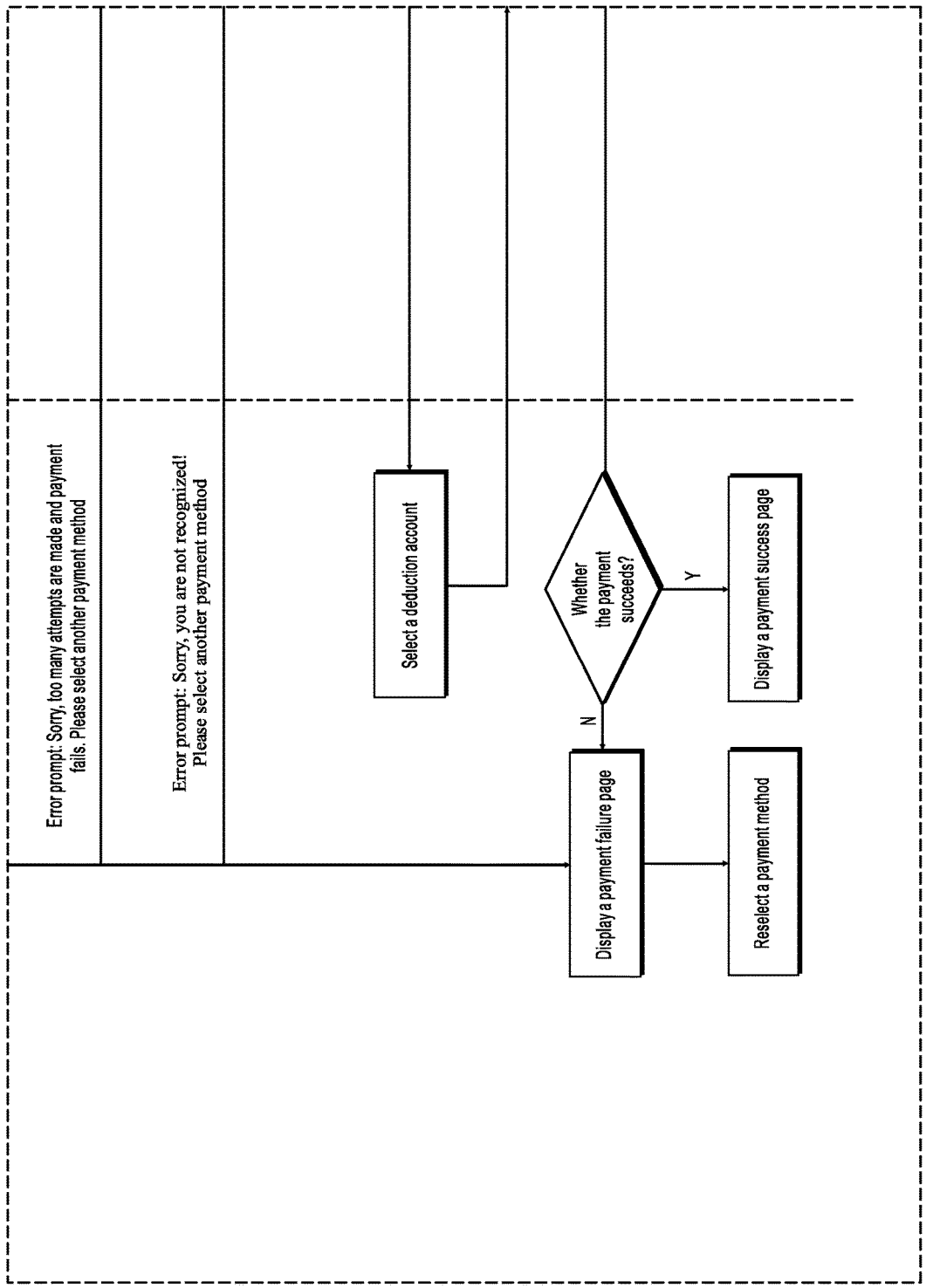
Figure 5G:
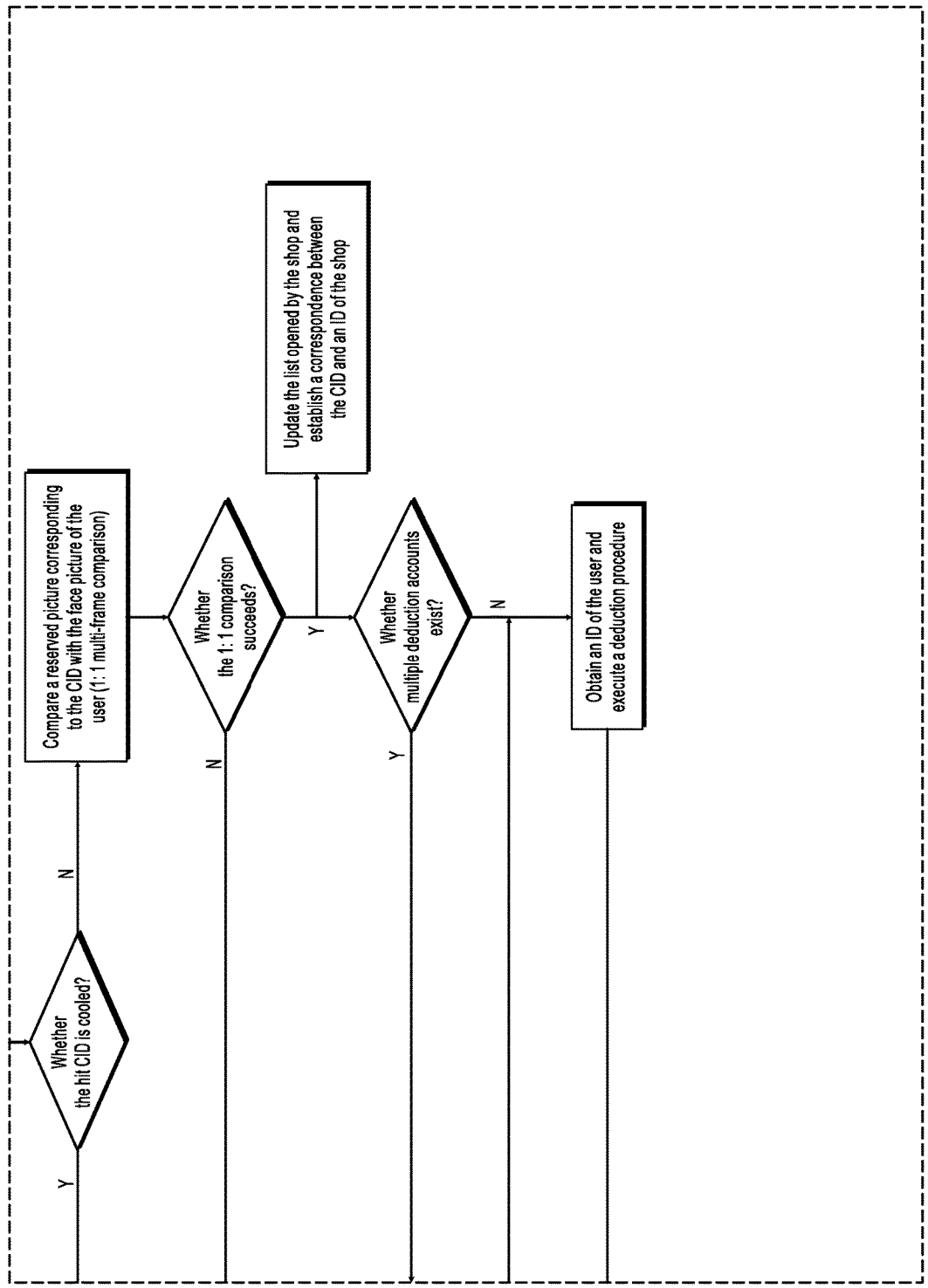

The implementations of the present application are described above from different perspectives. In an application scenario, the resource is specifically a fund, the resource transferor is specifically a payer, the resource transfer identification information is specifically fund payment identification information, and the transferor account is specifically a payer account. The following uses an example to describe a specific implementation of a fund payment method in this scenario. Referring to FIG. 4, the method includes the following steps:

S301. Obtain a face image of a payer, where the face image is used to authenticate an identity of the payer.

S303. Obtain fund payment identification information of the payer, where the fund payment identification information corresponds to a payer account of the payer.

S305. Determine, based on the fund payment identification information, information about the payer account and a reference image corresponding to the payer account.

S307. Transfer a fund of the payer based on the information about the payer account when the face image matches the reference image.

FIGS. 5A-5G are schematic interaction diagrams illustrating a fund payment method applied to fund payment, according to an implementation of the present application.

After selecting a commodity, a user (which is specifically a payer here) can choose to perform offline self-service payment on a self-service terminal of a shop. The terminal has a face image collection function, and can serve as a face image collection device in this implementation of the present application. Preferably, the device has a 3D image collection function. During self-service payment, the user can choose to use cash or a bank card for payment, or can choose to use a third-party payment platform similar to ALIPAY for payment. After entering the third-party payment platform, the user can further select two-dimensional code scan payment, sound wave payment, payment code payment, etc. In particular, the user can further choose to perform face scan payment.

After the face of the user is scanned by using the self-service terminal, the self-service terminal sends an obtained face image of the user to a server (which is a server of the third-party payment platform here). The self-service terminal further uploads device information of the self-service terminal to the server, where the device information includes a brand, a device identification, a machine ID, etc.

After receiving the face image uploaded by the self-service terminal, the server first determines whether FaceID is cooled, that is, searches a face recognition permission restricted list for face image information that matches the face image, where the face recognition permission restricted list is used to store information about a face image whose face image recognition permission is restricted. If FaceID is cooled, the server can return an error prompt: The account is abnormal and payment fails. If FaceID is not cooled, that is, when the face image information that matches the face image does not exist in the face recognition permission restricted list, the server performs a next stage of determining, to determine an information type of needed fund payment identification information.

Specifically, if the shop corresponding to the self-service terminal does not enable 1: N hotspot customer set N (that is, there is no set of hotspot users corresponding to the face image collection device), the information type of the fund payment identification information is directly determined as second information, and the user is prompted to enter the second information. If the shop corresponding to the self-service terminal enables 1: N hotspot customer set N, a set of hotspot users corresponding to the device is determined based on identification information of the device, where the set of hotspot users includes user hotspot information associated with the device. Then, the face image of the payer is matched with the user hotspot information. If the face image of the payer matches the user hotspot information, it is determined that the needed fund payment identification information is first information; otherwise, it is determined that the needed fund payment identification information is second information, where security of the second information is higher than security of the first information.

In an optional implementation, the second information can be personal identity information of the payer, received fund payment verification information, or order information associated with a fund to be transferred, and the first information can be a part of the second information. Alternatively, the second information can be biometric feature information of the payer, and the first information can be personal identity information of the payer, received fund payment verification information, or order information associated with a fund to be transferred. For example, as shown in FIGS. 5A-5G, the first information is the last four digits of a mobile number of the user, and the second information is the 11-digit mobile number of the user.

A process of determining the information type of the fund payment identification information by using hotspot customer set N can be specifically: querying a UID list of effective users of the shop, that is, querying a user face image database opened by the shop, user UIDs that a nearby Wi-Fi probe is mapped to, and biometric feature information, such as user irises, opened by the shop, to determine, by using a multi-factor cross-verification algorithm, whether 1: N can be uniquely hit. If 1: N can be uniquely hit, the user is allowed to enter the first information with lower security; otherwise, the user is required to enter the second information with higher security.

Further, the server identifies a payment platform UID of the user by using the fund payment identification information such as the mobile number entered by the user. If the entered mobile number can match the payment platform UID, subsequent verification can be performed; otherwise, it indicates that a payment platform account corresponding to the mobile number does not exist, and a payment failure message is returned. Further, if the payment platform UID is mapped to multiple CIDs, 1: N comparison is used to compare the face image with reserved pictures corresponding to the CIDs. If a unique CID can be hit, subsequent risk control verification is continued; otherwise, a payment failure message is fed back.

During the risk control verification, it can be determined whether a face payment function or permission is opened for the payment platform UID, and it can be determined whether the function or permission is available. For example, assume that, based on a function configuration of the payment platform, an enterprise user, a non-real-name user, or a non-continent user can be prohibited from using a face recognition function for payment, if an account type of the user is such an account that has no face image recognition permission, the user cannot perform face scan payment. For another example, the server can set a blacklist. If the payment platform UID of the user is recorded in the blacklist, it indicates that an account of the user is prohibited from performing face scan payment, and an error prompt can be fed back, to prompt the user to select another payment method. The server can further verify whether a quantity of fund payment failure of the payer account reaches a predetermined value, whether a geographical location state of the payer account is a normal state, etc.

When the risk control verification succeeds, a 1:1 multi-frame comparison can be performed between the obtained face image and a reserved reference image. If the comparison fails, a payment failure message can be returned. If the comparison succeeds, it can be further checked whether the payment platform UID corresponds to multiple deduction accounts, and the user can select an actual deduction account, so that the fund payment can be successfully completed.

It is worthwhile to note that, after it is confirmed, through a series of verification, that the user can perform face scan payment on the self-service terminal, a correspondence between an ID of the user and an ID of the shop can be established, and it can be considered that the user opens a face recognition function in the shop, and then the set of hotspot users corresponding to the self-service terminal can be updated, so that the user only needs to enter the more concise first information with lower security when the user performs face scan payment on the terminal next time.

In the previous implementation, the corresponding payer account and reference image are identified based on the fund payment identification information of the payer, and the face image of the payer is compared with the reference image to implement authentication on the identity of the payer, so that the fund is paid based on the information about the payer account when the face image matches the reference image. According to the technical solutions provided in this implementation of the present application, the account information and the reference image of the payer are identified by using the fund payment identification information, and identity authentication is performed by using the face image inherent to the payer. It can alleviate a potential fund payment security risk caused by embezzlement of authentication information such as a user name or a password of the payer or a loss of a hardware facility, such as a U shield, used for authentication. In addition, the payer can more conveniently and quickly pay the fund without additionally recording or carrying information or a facility for authentication.

Figure 6:
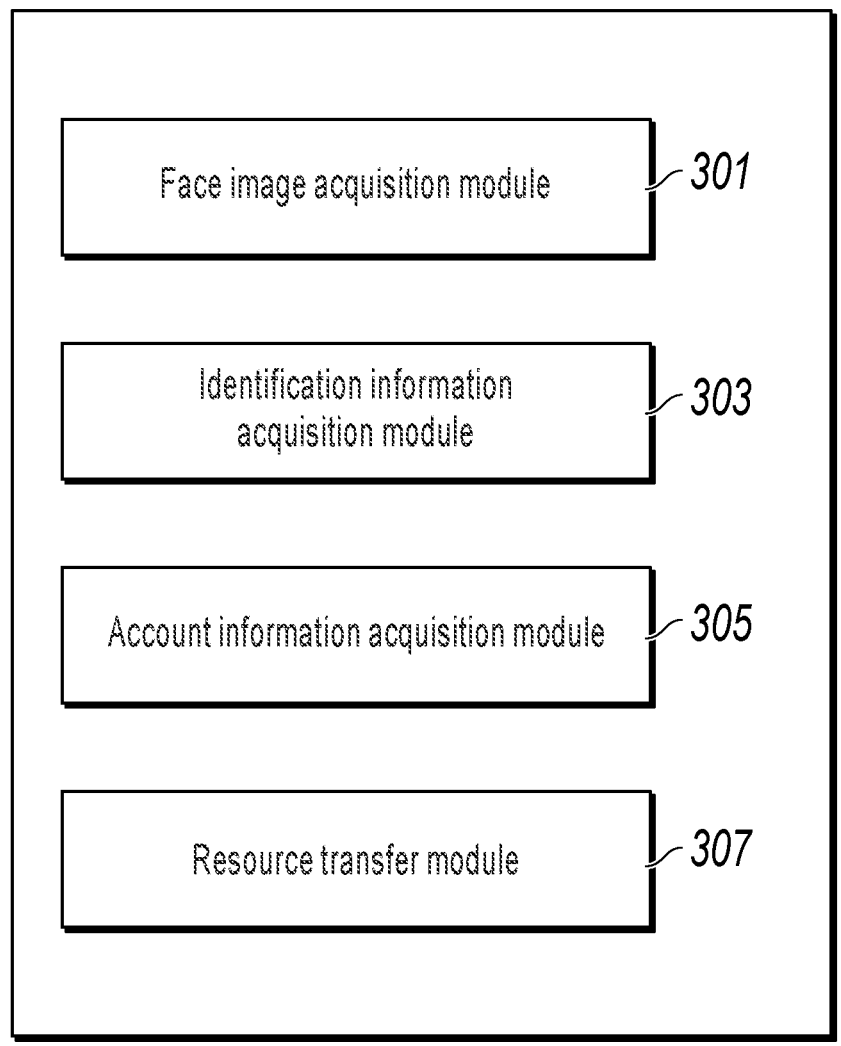
FIG. 6 is a schematic structural diagram illustrating a resource transfer apparatus, according to an implementation of the present application.

An implementation of the present application further provides a resource transfer apparatus. Referring to FIG. 6, the apparatus includes: a face image acquisition module 301, configured to obtain a face image of a resource transferor, where the face image is used to authenticate an identity of the resource transferor; an identification information acquisition module 303, configured to obtain resource transfer identification information of the resource transferor, where the resource transfer identification information corresponds to a transferor account of the resource transferor; an account information acquisition module 305, configured to determine, based on the resource transfer identification information, information about the transferor account and a reference image corresponding to the transferor account; and a resource transfer module 307, configured to transfer a resource of the resource transferor based on the information about the transferor account when the face image matches the reference image.

The resource transfer apparatus can further perform the method in the implementation shown in FIG. 1. For specific implementation, references can be made to the implementation shown in FIG. 1. Details are omitted.

Figure 7:
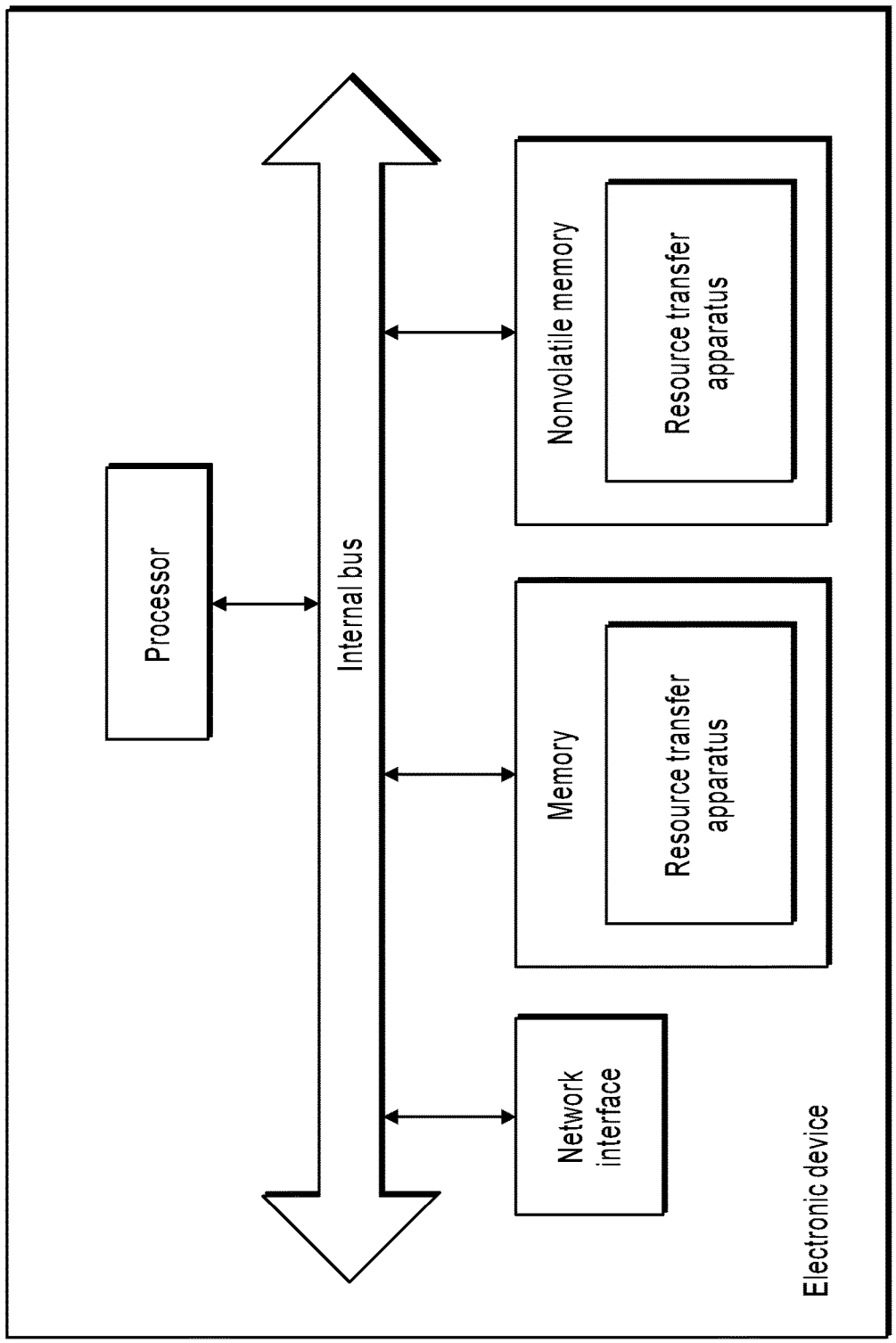
FIG. 7 is a schematic structural diagram illustrating a first electronic device, according to an implementation of the present application.

FIG. 7 is a schematic structural diagram illustrating an electronic device, according to an implementation of the present application. Referring to FIG. 7, in terms of hardware, the electronic device includes a processor, and optionally further includes an internal bus, a network interface, and a storage. The storage can include a memory, for example, a high-speed random access memory (RAM), and can further include a nonvolatile memory (NVM), for example, at least one magnetic disk memory. Certainly, the electronic device can further include hardware needed by another service.

The processor, the network interface, and the storage can be connected to each other by using the internal bus. The internal bus can be an industry standard architecture (ISA) bus, a peripheral component interconnect (PCI) bus, an extended industry standard architecture (EISA) bus, etc. The bus can be classified as an address bus, a data bus, a control bus, etc. For ease of indication, the bus is indicated by using only one double-headed arrow in FIG. 7. However, it does not mean that there is only one bus or only one type of bus.

The storage is configured to store a program. Specifically, the program can include program code, and the program code includes a computer operation instruction. The storage can include the memory and the nonvolatile memory, and provide an instruction and data for the processor.

The processor reads a corresponding computer program from the nonvolatile memory to the memory for running, to logically form a resource transfer apparatus. The processor executes the program stored in the storage, and is specifically configured to perform the following operations: obtaining a face image of a resource transferor, where the face image is used to authenticate an identity of the resource transferor, and obtaining resource transfer identification information of the resource transferor, where the resource transfer identification information corresponds to a transferor account of the resource transferor; determining, based on the resource transfer identification information, information about the transferor account and a reference image corresponding to the transferor account; and transferring a resource of the resource transferor based on the information about the transferor account when the face image matches the reference image.

The previous method that is disclosed in the implementation shown in FIG. 1 in the present application and that is performed by the resource transfer apparatus can be applied to the processor, or can be implemented by the processor. The processor can be an integrated circuit chip and have a signal processing capability. In an implementation process, the steps in the previous method can be implemented by using a hardware integrated logical circuit in the processor, or by using instructions in a form of software. The processor can be a general-purpose processor, including a central processing unit (CPU), a network processor (NP), etc. Alternatively, the processor can be a digital signal processor (DSP), an application-specific integrated circuit (ASIC), a field programmable gate array (FPGA), another programmable logic device, a discrete gate, a transistor logic device, or a discrete hardware component. The processor can implement or perform the methods, the steps, and the logical block diagrams disclosed in the implementations of the present application. The general-purpose processor can be a microprocessor, or the processor can be any conventional processor, etc. The steps of the methods disclosed in the implementations of the present application can be directly performed by a hardware decoding processor, or performed by a combination of hardware in the decoding processor and software modules. The software module can be located in a mature storage medium in the field, for example, a random access memory, a flash memory, a read-only memory, a programmable read-only memory, an electrically erasable programmable memory, or a register. The storage medium is located in the storage, and the processor reads information in the storage and completes the steps in the previous method in combination with hardware in the processor.

The electronic device can further perform the method in FIG. 1 that is performed by the resource transfer apparatus, and implement a function of the resource transfer apparatus in the implementation shown in FIG. 1. Details are omitted in this implementation of the present application.

An implementation of the present application further provides a computer readable storage medium. The computer readable storage medium stores one or more programs, and the one or more programs include an instruction. When the instruction is executed by an electronic device including multiple application programs, the electronic device is enabled to perform the method performed by the resource transfer apparatus in the implementation shown in FIG. 1, and is specifically configured to perform the following operations: obtaining a face image of a resource transferor, where the face image is used to authenticate an identity of the resource transferor, and obtaining resource transfer identification information of the resource transferor, where the resource transfer identification information corresponds to a transferor account of the resource transferor; determining, based on the resource transfer identification information, information about the transferor account and a reference image corresponding to the transferor account; and transferring a resource of the resource transferor based on the information about the transferor account when the face image matches the reference image.

Figure 8:
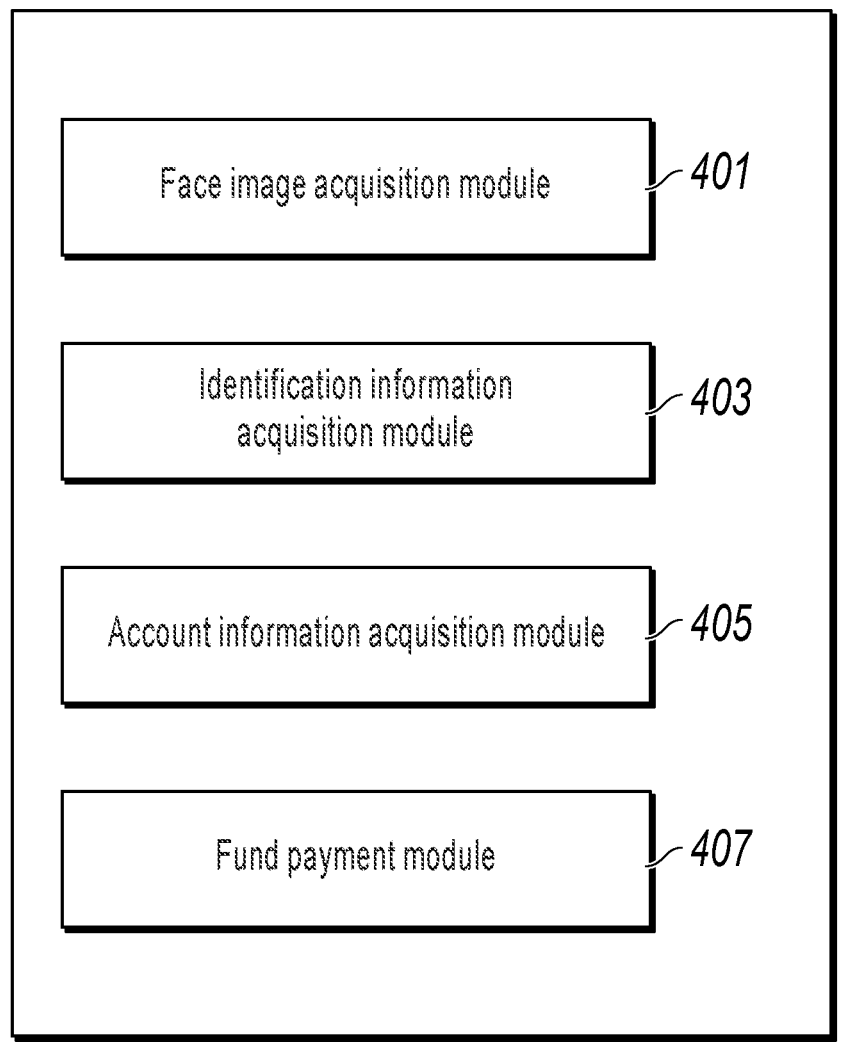
FIG. 8 is a schematic structural diagram illustrating a fund payment apparatus, according to an implementation of the present application.

For a fund payment application scenario, an implementation of the present application further provides a fund payment apparatus. Referring to FIG. 8, the apparatus includes: a face image acquisition module 401, configured to obtain a face image of a payer, where the face image is used to authenticate an identity of the payer; an identification information acquisition module 403, configured to obtain fund payment identification information of the payer, where the fund payment identification information corresponds to a payer account of the payer; an account information acquisition module 405, configured to determine, based on the fund payment identification information, information about the payer account and a reference image corresponding to the payer account; and a fund payment module 407, configured to transfer a fund of the payer based on the information about the payer account when the face image matches the reference image.

The fund payment apparatus can further perform the method in the implementation shown in FIG. 4. For specific implementation, references can be made to the implementation shown in FIG. 4. Details are omitted.

Figure 9:
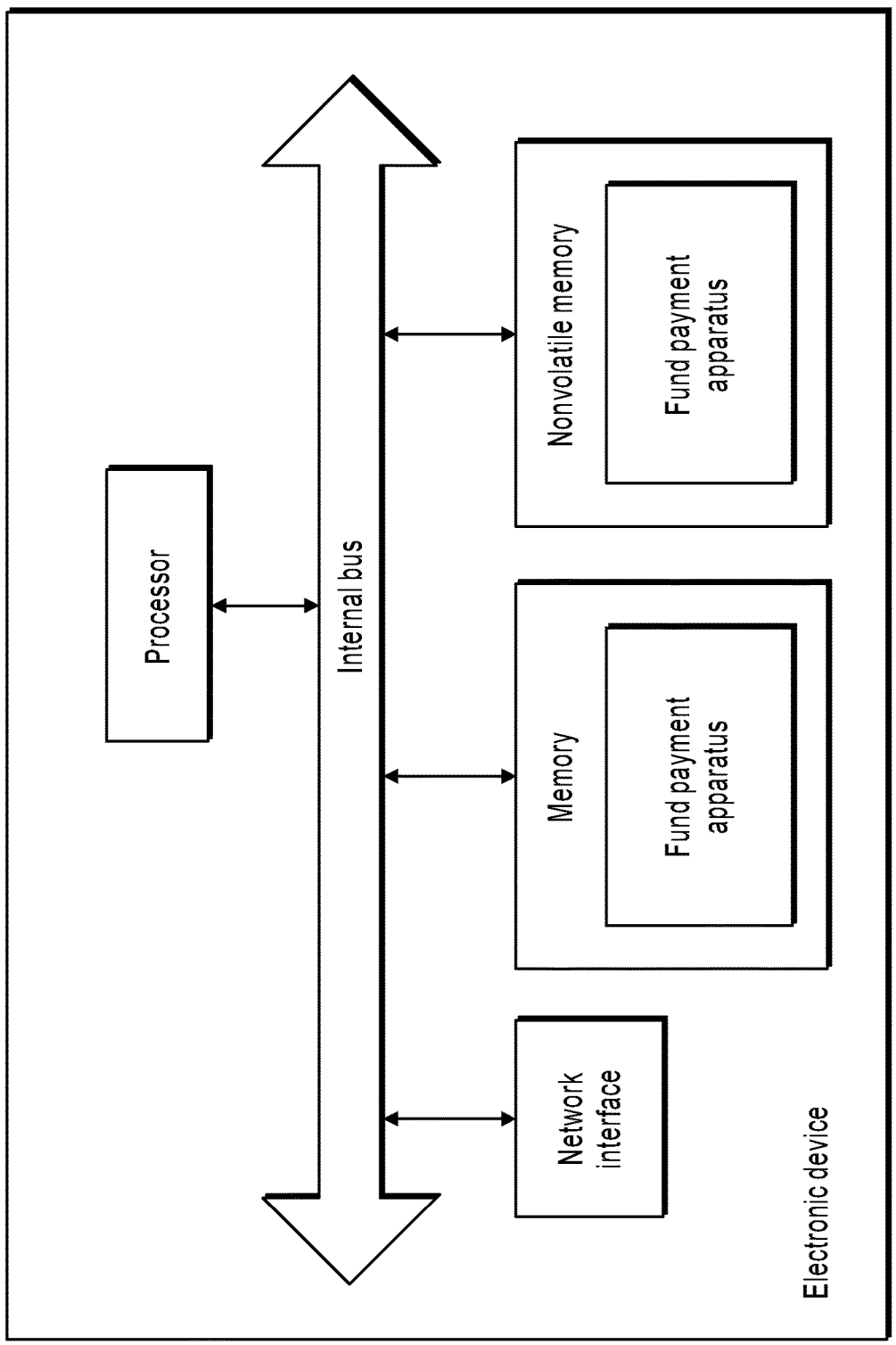
FIG. 9 is a schematic structural diagram illustrating a second electronic device, according to an implementation of the present application.

FIG. 9 is a schematic structural diagram illustrating an electronic device, according to an implementation of the present application. Referring to FIG. 9, in terms of hardware, the electronic device includes a processor, and optionally further includes an internal bus, a network interface, and a storage. The storage can include a memory, for example, a high-speed random access memory (RAM), and can further include a nonvolatile memory (NVM), for example, at least one magnetic disk memory. Certainly, the electronic device can further include hardware needed by another service.

The processor, the network interface, and the storage can be connected to each other by using the internal bus. The internal bus can be an industry standard architecture (ISA) bus, a peripheral component interconnect (PCI) bus, an extended industry standard architecture (EISA) bus, etc. The bus can be classified as an address bus, a data bus, a control bus, etc. For ease of indication, the bus is indicated by using only one double-headed arrow in FIG. 9. However, it does not mean that there is only one bus or only one type of bus.

The storage is configured to store a program. Specifically, the program can include program code, and the program code includes a computer operation instruction. The storage can include the memory and the nonvolatile memory, and provide an instruction and data for the processor.

The processor reads a corresponding computer program from the nonvolatile memory to the memory for running, to logically form a fund payment apparatus. The processor executes the program stored in the storage, and is specifically configured to perform the following operations: obtaining a face image of a payer, where the face image is used to authenticate an identity of the payer, and obtaining fund payment identification information of the payer, where the fund payment identification information corresponds to a payer account of the payer; determining, based on the fund payment identification information, information about the payer account and a reference image corresponding to the payer account; and transferring a fund of the payer based on the information about the payer account when the face image matches the reference image.

The previous method that is disclosed in the implementation shown in FIG. 4 in the present application and that is performed by the fund payment apparatus can be applied to the processor, or can be implemented by the processor. The processor can be an integrated circuit chip and have a signal processing capability. In an implementation process, the steps in the previous method can be implemented by using a hardware integrated logical circuit in the processor, or by using instructions in a form of software. The processor can be a general-purpose processor, including a central processing unit (CPU), a network processor (NP), etc. Alternatively, the processor can be a digital signal processor (DSP), an application-specific integrated circuit (ASIC), a field programmable gate array (FPGA), another programmable logic device, a discrete gate, a transistor logic device, or a discrete hardware component. The processor can implement or perform the methods, the steps, and the logical block diagrams disclosed in the implementations of the present application. The general-purpose processor can be a microprocessor, or the processor can be any conventional processor, etc. The steps of the methods disclosed in the implementations of the present application can be directly performed by a hardware decoding processor, or performed by a combination of hardware in the decoding processor and software modules. The software module can be located in a mature storage medium in the field, for example, a random access memory, a flash memory, a read-only memory, a programmable read-only memory, an electrically erasable programmable memory, or a register. The storage medium is located in the storage, and the processor reads information in the storage and completes the steps in the previous method in combination with hardware in the processor.

The electronic device can further perform the method in FIG. 4 that is performed by the fund payment apparatus, and implement a function of the fund payment apparatus in the implementation shown in FIG. 4. Details are omitted in this implementation of the present application.

An implementation of the present application further provides a computer readable storage medium. The computer readable storage medium stores one or more programs, and the one or more programs include an instruction. When the instruction is executed by an electronic device including multiple application programs, the electronic device is enabled to perform the method performed by the fund payment apparatus in the implementation shown in FIG. 4, and is specifically configured to perform the following operations: obtaining a face image of a payer, where the face image is used to authenticate an identity of the payer, and obtaining fund payment identification information of the payer, where the fund payment identification information corresponds to a payer account of the payer; determining, based on the fund payment identification information, information about the payer account and a reference image corresponding to the payer account; and transferring a fund of the payer based on the information about the payer account when the face image matches the reference image.

It is worthwhile to note that all the steps of the methods provided in the implementations of the present application can be performed by the same device, or can be performed by different devices. This is not limited in the present application.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a magnetic disk memory, a CD-ROM, an optical memory, etc.) that include computer-usable program code.

The present disclosure is described with reference to the flowcharts and/or block diagrams of the method, the device (system), and the computer program product according to the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or processors of other programmable data processing devices to generate a machine, so that the instructions executed by the computer or processors of other programmable data processing devices generate an apparatus for implementing a specific function in one or more processes in the flowcharts and/or in one or more blocks in the block diagrams.

These computer program instructions can be stored in a computer readable memory that can instruct the computer or other programmable data processing devices to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or other programmable data processing devices, so that a series of operations and steps are performed on the computer or other programmable devices, thereby generating computer-implemented processing. Therefore, the instructions executed on the computer or other programmable devices provide steps for implementing a specific function in one or more processes in the flowcharts and/or in one or more blocks in the block diagrams.

In a typical configuration, a computing device includes one or more processors (CPUs), an input/output interface, a network interface, and a memory.

The memory can include a non-persistent memory, a random access memory (RAM), a nonvolatile memory, and/or another form of memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase-change memory (PRAM), a static random access memory (SRAM), a dynamic random access memory (DRAM), another type of random access memory (RAM), a read-only memory (ROM), an electrically erasable programmable read-only memory (EEPROM), a flash memory, another memory technology, a compact disc read-only memory (CD-ROM), a digital versatile disc (DVD), another optical storage, a cassette magnetic tape, a magnetic tape/magnetic disk storage, another magnetic storage device, or any other non-transmission media. The computer storage medium can be used to store information accessible to the computing device. Based on the definition in the present specification, the computer readable medium does not include computer readable transitory media (transitory media) such as a modulated data signal and carrier.

It is worthwhile to further note that, the terms "comprise", "include", or their any other variants are intended to cover a non-exclusive inclusion, so that a process, a method, a commodity, or a device that includes a list of elements not only includes those elements but also includes other elements that are not expressly listed, or further includes elements inherent to such a process, method, commodity, or device. Without more constraints, an element preceded by "includes a . . . " does not preclude the existence of additional identical elements in the process, method, commodity, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a magnetic disk memory, a CD-ROM, an optical memory, etc.) that include computer-usable program code.

The previous descriptions are merely implementations of the present application, and are not intended to limit the present application. A person skilled in the art can make various modifications and changes to the present application. Any modification, equivalent replacement, improvement, etc. made without departing from the spirit and principle of the present application shall fall within the scope of the claims in the present application.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

Techniques described herein produce one or more technical effects. The described techniques can improve the security of resource transfers. For example, the identity authentication can be performed by comparing a face image of the resource transferor with a reference image. It reduces the needs of using authentication information such as a user name or a password of the resource transferor, or a hardware facility, such as a U shield. Thus, the techniques reduce the risk of authentication information theft. In another example, a 3D photographing apparatus can be used to obtain the face image of the resource transferor. A face image depth threshold can be set to exclude a face image whose depth of field is less than the depth threshold. It can ensure that the server obtains an image of a living person, instead of obtaining an image of a photo, a model, etc. It helps to prevent a resource from being illegally transferred, thereby ensuring security of the resource. Further, the described techniques can save computer processing cycles, computer memory usage, and network bandwidth. For example, when determining that the obtained face image is included in the face recognition permission restricted list, the server can understand that a permission of face recognition using the obtained face image is restricted, and the server can disallow the resource transferor to use the face image for identity authentication. Therefore, the user does not need to upload other information, and the server can directly return a message that the current resource transfer fails. This can reduce unnecessary data processing by resource transferors and resource transferees. It can also reduce amounts of data transferred between resource transferors and resource transferees. In another example, when determining that the credibility of resource transfer between the resource transferor and the resource transferee is relatively high, the resource transferor can be allowed to enter shorter information (namely, the first information) as the resource transfer identification information for authentication, and thus reducing data processing and data transfers.

What is claimed is:

1. A computer-implemented method, comprising:
    receiving, by a server, a face image of a resource transferor from a device associated with a resource transferee comprising a 3D photographic apparatus;
    determining, by the server, a depth of field of the face image;
    determining, by the server, that the resource transferor is a living person, based on a determination that the depth of field of the face image satisfies a pre-determined depth threshold;
    obtaining, by the server, identification information of the device associated with the resource transferee comprising the 3D photographic apparatus;
    determining, by the server based on the identification information of the device associated with the resource transferee comprising the 3D photographic apparatus, a set of hotspot users previously associated with the device associated with the resource transferee comprising the 3D photographic apparatus in historical transactions;
    determining, by the server, whether the face image of the resource transferor corresponds to a user in the set of hotspot users;
    in response to determining, by the server, that the face image of the resource transferor does not correspond to a user in the set of hotspot users, determining, by the server, that a type of resource transfer identification information needed is second information,
        wherein security of the second information is higher than security of resource transfer identification information that is first information needed when the face image of the resource transferor corresponds to a user in the set of hotspot users,
        wherein the second information comprises biometric feature information, different from the face image, of the resource transferor, and wherein the first information is at least one of personal identity information of the resource transferor, received resource transfer verification information, and order information associated with a resource of the resource transferor to be transferred from the resource transferor to the resource transferee;
    requiring, by the server, the resource transferor to enter the resource transfer identification information that is the second information via the device associated with the resource transferee comprising the 3D photographic apparatus;
    obtaining, by the server, the resource transfer identification information of the resource transferor that is the second information from the device associated with the resource transferee comprising the 3D photographic apparatus, wherein the resource transfer identification information corresponds to a transferor account of the resource transferor;
    determining, by the server and based on the obtained resource transfer identification information that is the second information, information about the transferor account and a reference image stored on the server corresponding to the transferor account;
    determining, by the server, that the face image corresponds to the reference image; and
    transferring, by the server, the resource of the resource transferor to the resource transferee based on the information about the transferor account.

2. The computer-implemented method according to claim 1, wherein after the receiving, by the server, the face image of the resource transferor, and before the obtaining, by the server, the resource transfer identification information of the resource transferor that is the second information, the method further comprises:
    searching, by the server, a face recognition permission restricted list for face image information that corresponds to the face image, wherein the face recognition permission restricted list stores information about a face image whose face image recognition permission is restricted; and
    wherein the obtaining, by the server, the resource transfer identification information of the resource transferor that is the second information comprises:
        in response to determining, by the server, that the face image information that corresponds to the face image does not exist in the face recognition permission restricted list, obtaining, by the server, the resource transfer identification information of the resource transferor that is the second information.

3. The computer-implemented method according to claim 2, wherein after the receiving, by the server, the face image of the resource transferor, and before the obtaining, by the server, the resource transfer identification information of the resource transferor that is the second information, the method further comprises:

determining, by the server, that the identification information of the device associated with the resource transferee comprising the 3D photographic apparatus indicates that the device associated with the resource transferee comprising the 3D photographic apparatus is legal.

4. The computer-implemented method according to claim 1, wherein the determining, by the server based on the resource transfer identification information, information about the transferor account and the reference image corresponding to the transferor account comprises:
  identifying, by the server based on the resource transfer identification information that is the second information, information about multiple transferor accounts corresponding to the resource transfer identification information that is the second information; and
  in response to determining, by the server, that the information about the multiple transferor accounts corresponds to a same reference image, determining, by the server, the same reference image as the reference image corresponding to the transferor account.

5. The computer-implemented method according to claim 1, wherein after the transferring, by the server, the resource of the resource transferor to the resource transferee based on the information about the transferor account, the method further comprises:
  storing, by the server, the face image of the resource transferor as an adjusted reference image corresponding to the transferor account, wherein the adjusted reference image is used to match a future face image of the resource transferor in a future resource transfer.

6. The computer-implemented method according to claim 1, wherein before the transferring, by the server, the resource of the resource transferor to the resource transferee based on the information about the transferor account, the method further comprises:
  in response to determining, by the server, that the information about the transferor account satisfies a predetermined condition, determining, by the server, whether the face image corresponds to the reference image, wherein the predetermined condition comprises at least one of the following:
    a type of the transferor account is an account type that has a permission for face image recognition;
    the transferor account is not comprised in an illegal-account list;
    a quantity of resource transfer failures of the transferor account is smaller than a predetermined value; and
    a geographical location state of the transferor account is a normal state.

7. A non-transitory, computer-readable medium storing executable instructions that, when executed by a processor of a server, cause the processor of the server to perform operations comprising:
  receiving a face image of a resource transferor from a device associated with a resource transferee comprising a 3D photographic apparatus;
  determining a depth of field of the face image;
  determining that the resource transferor is a living person, based on a determination that the depth of field of the face image satisfies a pre-determined depth threshold;
  obtaining identification information of the device comprising the 3D photographic apparatus;
  determining, based on the identification information of the device associated with the resource transferee comprising the 3D photographic apparatus, a set of hotspot users previously associated with the device associated with the resource transferee comprising the 3D photographic apparatus in historical transactions;
  determining whether the face image of the resource transferor corresponds to a user in the set of hotspot users;
  in response to determining that the face image of the resource transferor does not correspond to a user in the set of hotspot users, determining that a type of resource transfer identification information needed is second information,
    wherein security of the second information is higher than security of resource transfer identification information that is first information needed when the face image of the resource transferor corresponds to a user in the set of hotspot users,
    wherein the second information comprises biometric feature information, different from the face image, of the resource transferor, and wherein the first information is at least one of personal identity information of the resource transferor, received resource transfer verification information, and order information associated with a resource of the resource transferor to be transferred from the resource transferor to the resource transferee;
  requiring the resource transferor to enter the resource transfer identification information that is the second information via the device associated with the resource transferee comprising the 3D photographic apparatus;
  obtaining the resource transfer identification information of the resource transferor that is the second information from the device associated with the resource transferee comprising the 3D photographic apparatus, wherein the resource transfer identification information corresponds to a transferor account of the resource transferor;
  determining, and based on the obtained resource transfer identification information that is the second information, information about the transferor account and a reference image corresponding to the transferor account;
  determining that the face image corresponds to the reference image; and
  transferring the resource of the resource transferor to the resource transferee based on the information about the transferor account.

8. The non-transitory, computer-readable medium according to claim 7, the non-transitory, computer-readable medium stores additional executable instructions that, when executed by the processor of the server, cause the processor of the server to perform operations comprising:
  after the receiving the face image of the resource transferor, and before the obtaining the resource transfer identification information of the resource transferor that is the second information,
    searching a face recognition permission restricted list for face image information that corresponds to the face image, wherein the face recognition permission restricted list stores information about a face image whose face image recognition permission is restricted; and
  wherein the obtaining the resource transfer identification information of the resource transferor that is the second information comprises:
    in response to determining that the face image information that corresponds to the face image does not exist in the face recognition permission restricted list, obtaining the resource transfer identification information of the resource transferor that is the second information.

9. The non-transitory, computer-readable medium according to claim 8, the non-transitory, computer-readable medium stores additional executable instructions that, when executed by the processor of the server, cause the processor of the server to perform operations comprising:
after the receiving the face image of the resource transferor, and before the obtaining the resource transfer identification information of the resource transferor that is the second information,
determining that the identification information of the device associated with the resource transferee comprising the 3D photographic apparatus indicates that the device associated with the resource transferee comprising the 3D photographic apparatus is legal.

10. The non-transitory, computer-readable medium according to claim 7, wherein the determining, based on the resource transfer identification information, information about the transferor account and the reference image corresponding to the transferor account comprises the non-transitory, computer-readable medium storing additional executable instructions that, when executed by the processor of the server, cause the processor of the server to further perform operations comprising:
identifying, based on the resource transfer identification information that is the second information, information about multiple transferor accounts corresponding to the resource transfer identification information that is the second information; and
in response to determining that the information about the multiple transferor accounts corresponds to a same reference image, determining the same reference image as the reference image corresponding to the transferor account.

11. The non-transitory, computer-readable medium according to claim 7, the non-transitory, computer-readable medium stores additional executable instructions that, when executed by the processor of the server, cause the processor of the server to perform operations comprising:
after the transferring the resource of the resource transferor to the resource transferee based on the information about the transferor account,
storing the face image of the resource transferor as an adjusted reference image corresponding to the transferor account, wherein the adjusted reference image is used to match a future face image of the resource transferor in a future resource transfer.

12. The non-transitory, computer-readable medium according to claim 7, the non-transitory, computer-readable medium stores additional executable instructions that, when executed by the processor of the server, cause the processor of the server to perform operations comprising:
before the transferring a resource of the resource transferor to the resource transferee based on the information about the transferor account,
in response to determining that the information about the transferor account satisfies a predetermined condition, determining whether the face image corresponds to the reference image, wherein the predetermined condition comprises at least one of the following:
a type of the transferor account is an account type that has a permission for face image recognition;
the transferor account is not comprised in an illegal-account list;
a quantity of resource transfer failures of the transferor account is smaller than a predetermined value; and
a geographical location state of the transferor account is a normal state.

13. A computer-implemented system, comprising:
a server comprising:
a processor; and
a non-transitory, computer-readable medium interoperably coupled to the processor and storing executable instructions that, when executed by the processor, cause the processor to perform operations comprising:
receiving a face image of a resource transferor from a device associated with a resource transferee comprising a 3D photographic apparatus;
determining a depth of field of the face image;
determining that the resource transferor is a living person, based on a determination that the depth of field of the face image satisfies a pre-determined depth threshold;
obtaining identification information of the device associated with the resource transferee comprising the 3D photographic apparatus;
determining, based on the identification information of the device associated with the resource transferee comprising the 3D photographic apparatus, a set of hotspot users previously associated with the device associated with the resource transferee comprising the 3D photographic apparatus in historical transactions;
determining whether the face image of the resource transferor corresponds to a user in the set of hotspot users;
in response to determining that the face image of the resource transferor does not correspond to a user in the set of hotspot users, determining that a type of resource transfer identification information needed is second information,
wherein security of the second information is higher than security of resource transfer identification information that is first information needed when the face image of the resource transferor corresponds to a user in the set of hotspot users,
wherein the second information comprises biometric feature information, different from the face image, of the resource transferor, and wherein the first information is at least one of personal identity information of the resource transferor, received resource transfer verification information, and order information associated with a resource of the resource transferor to be transferred from the resource transferor to the resource transferee;
requiring the resource transferor to enter the resource transfer identification information that is the second information via the device associated with the resource transferee comprising the 3D photographic apparatus;
obtaining the resource transfer identification information of the resource transferor that is the second information from the device associated with the resource transferee comprising the 3D photographic apparatus, wherein the resource transfer identification information corresponds to a transferor account of the resource transferor;
determining, and based on the obtained resource transfer identification information that is the second information, information about the transferor account and a reference image corresponding to the transferor account;

determining that the face image corresponds to the reference image; and transferring the resource of the resource transferor to the resource transferee based on the information about the transferor account.

14. The computer-implemented system according to claim 13, the non-transitory, computer-readable medium interoperably coupled to the processor and storing additional executable instructions that, when executed by the processor, cause the processor to perform operations comprising:

after the receiving the face image of the resource transferor, and before the obtaining the resource transfer identification information of the resource transferor that is the second information, searching a face recognition permission restricted list for face image information that corresponds to the face image, wherein the face recognition permission restricted list stores information about a face image whose face image recognition permission is restricted; and wherein the obtaining the resource transfer identification information of the resource transferor that is the second information comprises:

in response to determining that the face image information that corresponds to the face image does not exist in the face recognition permission restricted list, obtaining the resource transfer identification information of the resource transferor that is the second information.

15. The computer-implemented system according to claim 14, the non-transitory, computer-readable medium interoperably coupled to the processor and storing additional executable instructions that, when executed by the processor, cause the processor to perform operations comprising:

after the receiving the face image of the resource transferor, and before the obtaining the resource transfer identification information of the resource transferor that is the second information, determining that the identification information of the device associated with the resource transferee comprising the 3D photographic apparatus indicates that the device associated with the resource transferee comprising the 3D photographic apparatus is legal.

16. The computer-implemented system according to claim 13, wherein the determining, based on the resource transfer identification information, information about the transferor account and the reference image corresponding to the transferor account comprises:

identifying, based on the resource transfer identification information that is the second information, information about multiple transferor accounts corresponding to the resource transfer identification information that is the second information; and in response to determining that the information about the multiple transferor accounts corresponds to a same reference image, determining the same reference image as the reference image corresponding to the transferor account.

17. The computer-implemented system according to claim 13, the non-transitory, computer-readable medium interoperably coupled to the processor and storing additional executable instructions that, when executed by the processor, cause the processor to perform operations comprising:

before the transferring the resource of the resource transferor to the resource transferee based on the information about the transferor account, in response to determining that the information about the transferor account satisfies a predetermined condition, determining whether the face image corresponds to the reference image, wherein the predetermined condition comprises at least one of the following:

a type of the transferor account is an account type that has a permission for face image recognition;

the transferor account is not comprised in an illegal-account list;

a quantity of resource transfer failures of the transferor account is smaller than a predetermined value; and a geographical location state of the transferor account is a normal state.

* * * * *

UNITED STATES PATENT AND TRADEMARK OFFICE
CERTIFICATE OF CORRECTION

Page 1 of 1

PATENT NO. : 11,087,327 B2
APPLICATION NO. : 16/673199
DATED : August 10, 2021
INVENTOR(S) : Shumin Lin et al.

It is certified that error appears in the above-identified patent and that said Letters Patent is hereby corrected as shown below:

On the Title Page

Column 2, Line 3, Other Publications, delete "Geral" and insert -- Gerald --, therefor.

In the Claims

Column 26, Line 37, in Claim 7, before "based" delete "and".

Column 28, Line 66, in Claim 13, before "based" delete "and".

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*